United States Patent
Farag et al.

(10) Patent No.: US 12,377,451 B2
(45) Date of Patent: Aug. 5, 2025

(54) PROCESS FOR RECYCLING CONTAMINATED SOLID MATERIALS AND PURIFICATION OF GASES

(71) Applicant: GREENOVEL INC., Saint-Constant (CA)

(72) Inventors: Sherif Farag, Saint-Constant (CA); Mai Attia, Saint-Constant (CA)

(*) Notice: Subject to any disclaimer, the term of this patent is extended or adjusted under 35 U.S.C. 154(b) by 0 days.

(21) Appl. No.: 17/309,661

(22) PCT Filed: May 25, 2021

(86) PCT No.: PCT/CA2021/050700
§ 371 (c)(1),
(2) Date: Jun. 14, 2021

(87) PCT Pub. No.: WO2021/237342
PCT Pub. Date: Dec. 2, 2021

(65) Prior Publication Data
US 2023/0330723 A1    Oct. 19, 2023

Related U.S. Application Data

(60) Provisional application No. 63/029,693, filed on May 25, 2020.

(51) Int. Cl.
*B09B 3/40* (2022.01)
*B09B 3/50* (2022.01)
*B09B 3/70* (2022.01)
*B09B 101/15* (2022.01)

(52) U.S. Cl.
CPC ............... *B09B 3/40* (2022.01); *B09B 3/50* (2022.01); *B09B 3/70* (2022.01); *B09B 2101/15* (2022.01)

(58) Field of Classification Search
CPC ......... B09B 2101/15; B09B 3/40; B09B 3/50; B09B 3/70; C10B 19/00; C10B 53/07; C10G 1/10; Y02P 20/143
See application file for complete search history.

(56) References Cited

U.S. PATENT DOCUMENTS

| | | | | |
|---|---|---|---|---|
| 4,024,048 A | * | 5/1977 | Shell | C10G 75/04 585/866 |
| 2021/0122898 A1 | * | 4/2021 | Luthe | B02C 17/00 |

FOREIGN PATENT DOCUMENTS

WO    WO-2019141504 A1 *  7/2019  ............. B02C 17/00

OTHER PUBLICATIONS

Yang et al, "Pyrolysis and Dehalogenation of Plastics from Waste Electrical and Electronic Equipment (WEEE): A Review", Waste Management, vol. 33, pp. 462-473, 2013 (Year: 2013).*

(Continued)

*Primary Examiner* — Frances Tischler

(57) ABSTRACT

A process for recycling contaminated solid material is provided. The process comprises heating the material yielding a solid phase, an oil phase, and a gas phase. Prior to being heated, the material is subjected to a pre-treatment involving a dehalogenation agent (DHA). The gas phase obtained is further subjected to a purification treatment. The DHA agent used is regenerated using a regeneration agent (RGA) and further re-used in the process.

11 Claims, 9 Drawing Sheets

(56) References Cited

OTHER PUBLICATIONS

Forti V, Balde CP, Kuehr R, Garam B. 2020. The global E-waste monitor 2020: quantities, flows and the circular economy potential. United Nations University/United Nations Institute for Training and Research, International Telecommunication Union, and International Solid Waste Association.

Das P, Gabriel JCP, Tay CY, Lee JM. 2021. Value-added products from thermochemical treatments of contaminated e-waste plastics. Chemosphere. 269, 129409.

Damrongsiri S, Vassanadumrongdee S, Tanwattana P. 2016. Heavy metal contamination characteristic of soil in WEEE (waste electrical and electronic equipment) dismantling community: a case study of Bangkok, Thailand. Environmental Science and Pollution Research. 23, 17026-17034.

Debnath B, Chowdhury R, Ghosh SK. 2018. Sustainability of metal recovery from E-waste. Frontiers of Environmental Science & Engineering. 12, 2.

Kefeni KK, Okonkwo JO, Olukunle OI, Botha BM. 2011. Brominated flame retardants: sources, distribution, exposure, pathways, and toxicity. Environmental Reviews. 19, 238-253.

Olubanjo K, Osibanjo O, Chidi Ni. 2015. Evaluation of Pb and Cu contents of selected component parts of waste personal computers. Journal of Applied Sciences and Environmental Management. 19, 470-477.

Ortuño N, Moltó J, Conesa JA, Font R. 2014. Formation of brominated pollutants during the pyrolysis and combustion of tetrabromobisphenol A at different temperatures. Environmental Pollution. 191,31-37.

Wong MH, Wu SC, Deng WJ, Yu XZ, Luo Q, Leung AOW, Wong CSC, Luksemburg WJ, Wong AS. 2007. Export of toxic chemicals—a review of the case of uncontrolled electronic-waste recycling. Environmental Pollution. 149, 131-140.

Lilienthal H, van der Ven LTM, Piersma AH, Vos JG. 2009. Effects of the brominated flame retardant hexabromocyclododecane (HBCD) on dopamine-dependent behavior and brainstem auditory evoked potentials in a one-generation reproduction study in Wistar rats. Toxicology Letters. 185, 63-72.

Mohammed MI, Mohan M, Das A, Johnson MD, Singh PB, McLean D, Gibson I. 2017. A low carbon footprint approach to the reconstitution of plastics into 3D-printer filament for enhanced waste reduction. The International Conference on Design and Technology. 234-241.

Arvanitoyannis IS. 2013. Waste management for polymers in food packaging industries. In: Plastic films in food packaging. William Andrew Publishing, Oxford.

Stewart E, Lemieux P. 2003. Emission from the incineration of electronics industry waste. IEEE International Symposium on Electronics and the Environment. 271-275.

Yin J, Li G, He W, Huang J, Xu M. 2011. Hydrothermal decomposition of brominated epoxy resin in waste printed circuit boards. Journal of Analytical and Applied Pyrolysis. 92, 131-136.

Zhao XY, Xia YH, Zhan L, Xie B, Gao B, Wang JL. 2019. Hydrothermal treatment of e-waste plastics for tertiary recycling: product slate and decomposition mechanisms. ACS Sustainable Chemistry & Engineering. 7, 1464-1473.

Zhang TH, Mao X, Qu JS, Liu Y, Siyal AA, Ao WY, Fu J, Dai JJ, Jiang ZH, Deng ZY, Song YM, Wang DY, Polina C. 2021. Microwave-assisted catalytic pyrolysis of waste printed circuit boards, and migration and distribution of bromine. Journal of Hazardous Materials. 402, 123749.

Liu M, Zhuo JK, Xiong SJ, Yao Q. 2014. Catalytic degradation of high-density polyethylene over a clay catalyst compared with other catalysts. Energy Fuels, 28, 6038-6045.

Hall WJ, Miskolczi N, Onwudili J, Williams PT. 2008. Thermal processing of toxic flame-retarded polymer using a waste fluidized catalytic cracker (FCC) catalyst. Energy Fuels. 22, 1691-1697.

Evangelopoulos P, Arato S, Persson H, Kantarelis E, Yang W. 2019. Reduction of brominated flame retardants (BFRs) in plastics from waste electrical and electronic equipment (WEEE) by solvent extraction and the influence on their thermal decomposition. Waste Management. 94, 165-171.

A. Mnim Altwaiq, Wolf M, van Eldik R. 2003. Extraction of brominated flame retardants from polymeric waste material using different solvents and supercritical carbon dioxide. Analytica Chimica Acta. 491, 111-123.

Schlummer M, Brandl F, Mäurer A, van Eldik R. 2005. Analysis of flame retardant additives in polymer fractions of waste of electric and electronic equipment (WEEE) by means of HPLC-UV/MS and GPC-HPLC-UV. Journal of Chromatography A. 1064, 39-51.

Gao RT, Liu BY, Zhan L, Guo J, Zhang J, Xu ZM. 2021. Catalytic effect and mechanism of coexisting copper on conversion of organics during pyrolysis of waste printed circuit boards. Journal of Hazardous Materials. 403, 123465.

Zhan L, Zhao XY, Ahmad Z, Xu ZM. 2020. Leaching behavior of Sb and Br from E-waste flame retardant plastics. Chemosphere. 245, 125684.

Truc NTT, Lee BK. 2017. Selective separation of ABS/PC containing BFRs from ABSs mixture of WEEE by developing hydrophilicity with ZnO coating under microwave treatment. Journal of Hazardous Materials. 329, 84-91.

Zhang CC, Zhang FS. 2012. Removal of brominated flame retardant from electrical and electronic waste plastic by solvothermal technique. Journal of Hazardous Materials. 221-222, 193-198.

Fang et al. 2012. Needleless melt-electrospining of polypropylene nanofibers. Journal of Nanomaterials. 2012, 382639.

Wagner F, Peeters JR, Ramon H, Keyzer JD, Duflou JR, Dewulf W. Quality assessment of mixed plastic flakes from waste electrical and electronic equipment (WEEE) by spectroscopic techniques. Resources, Convesion and Recycling. 158, 104801.

Limcharoen A, Limsuwan P, Pakpum C, Siangchaew K. 2013. Chacterization of C-F polymer film formation on the air-bearing surface etched sidewall of fluorine-based plasma interaction with Al2O3'TiC substrate. Journal of Nanomaterials. 2013, 851489.

Annamalai M, Gurumurthy K. 2020. Characterization of end-of-life mobile phone printed circuit boards for its elemental composition and beneficiation analysis. Journal of the Air & Waste Management Association. 315-327.

Grigorescu RM, Ghioca P, Iancu L etc. 2020. Developmentn of thermoplastic composites based on recycled polypropylene and waste printed circuit boards. Waste Management. 118, 391-401.

Shen YF, Chen XM, Ge XL, Chen MD. 2018. Chemical pyrolysis of E-waste plastics: char characterization. Journal of Environmental Management. 214, 94-103.

De Silva FN, Bassaco MM, Bertuol DA, Tanabe EH. 2019. An eco-friendly approach for metals extraction using polymeric nanofibers modified with di-(2-ethylhexyl) phosphoric acid (DEHPA). Journal of Cleaner Production. 210, 786-794.

Wang Y, Sun SY, Yang F, Li SY, Wu JQ, Liu JY, Zhong S, Zeng JJ. 2015. The effects of activated Al2O3 on the recycling of light oil from the catalytic pyrolysis of waste printed circuit boards. Process Safety and Environmental Protection. 98, 276-284.

Ye ZW, Yang F, Qiu YQ, Chen NW, Lin WX, Sun SY. 2018. The dibrominated and lightweight oil generated from two stage pyrolysis of WPCBs by using compound chemical additives. Process Safety and Environmental Protection. 116, 654-662.

Cortina JL, Miralles N, Aguilar M. 1997. Solid-liquid extraction studies of divalent metals with impregnated resins containing mixgures of organophosphorous extractants. Reactive and Functional Polymers. 32, 221-229.

Cheraghi A, Ardakani MS, Alamdari EK, Fatmesari DH, Darvishih D, Sadrnezhaad SK. 2015. Thermodynamics of vanadium (V) solvent extraction by mixture of D2EHPA and TBP. International Journal of Mineral Processing. 138, 49-54.

* cited by examiner

PROCESS FOR RECYCLING CONTAMINATED SOLID MATERIALS AND PURIFICATION OF GASES

CROSS REFERENCE TO RELATED APPLICATIONS

This application claims benefit of U.S. Provisional Patent Application No. 63/029,693, filed on May 25, 2020, the content of which is incorporated herein in its entirety by reference.

FIELD OF THE INVENTION

The present invention relates generally to processes for recycling contaminated solid materials including plastic materials such as electronic waste (E-waste) plastic materials. More specifically, the invention relates to such a process that uses a microwave-pyrolysis and that is environmental-friendly. The invention also relates to a process for purifying a gas emission.

BACKGROUND OF THE INVENTION

Owing to the industrialization, economic expansion and growing global population, the electric and electronic product manufacturing sector is expanding worldwide, which leads to a dramatic increase in the amount of electronic waste (E-waste), from 44.75 Mt in 2016 to 53.6 Mt in 2020 according to the UN Global E-waste Monitor 2020 report. In the circumstance of the generation of an abundant amount of E-waste, only 17.4% of E-waste is appropriately collected and recycled, and the remaining 82.6% of E-waste is either dumped in landfills or traded through illegal market (Forti et al., 2020 [1]).

Consequently, finding ways to properly recycle of E-waste has become a serious environmental issue worldwide. Most of the current recycling strategies focus on the recovery of valuable metals present in E-wastes such as gold, silver, and copper; and the plastic fraction of E-waste is usually either incinerated or discarded (Das et al., 2021 [2]).

Plastic fraction accounts for 25-30% of the E-wastes, and this plastic material is typically composed of high-quality polymers such as polycarbonate (PC), polypropylene (PP), high impact polystyrene (HIPS), and acrylonitrile butadiene styrene (ABS) (Das et al., 2021 [2]). However, the plastic material in E-waste usually also contains highly toxic substances including heavy metals (e.g., Pb, Hg, and Cd) and brominated flame retardants (BFRs) (Damrongsiri et al., 2016 [3]; Dehnath et al., 2018 [4]). For instance, the concentration of Pb in cathode-ray tubes (CRTs) and printing wiring boards was reported to be 429-9,900 mg/kg and 18,060-400,560 mg/kg, respectively, amounts which significantly exceed the permissible limit of 10 µg/L (Olubanjo et al., 2015 [6]).

Flame retardants (FRs) are considered key components of electric and electronic products; they are often added to the products in order to meet the fire safety standards. Among commercially available FRs such as nitrogen- and phosphorous-based FRs, brominated FRs are the most commonly used. However, they are persistent, bio-accumulative and toxic in nature (Kefeni et al., 2011 [5]). The broadly used BFRs in the plastics of electric and electronic products include: tetrabromobisphenol A (TBBPA), polybrominated diphenyl ethers (PBDEs), hexabromocyclo dodecane (HBCD), and polybrominated biphenyls (PBB); among which TBBPA represents around 60% of the total volume of BFRs (Ortuño et al., 2014 [7]).

Upon thermal degradation of BFR-containing E-waste plastics, a wide range of hazardous pollutants such as HBr and brominated aromatic compounds can be emitted. Brominated aromatic compounds are precursors to polybrominated dibenzo-p-dioxins (PBDD) and polybrominated dibenzo furans (PBDF), which are known to present serious environmental problems (Wong et al., 2007 [8]) and to have harmful impacts on human health (Lilienthal et al., 2009 [9]).

Conventional E-waste plastics recycling generally consists of mechanical, chemical, and thermal processes. In the mechanical recycling, the approaches typically include grinding, washing, separation, drying, re-granulation, extrusion, and compounding where the recycled material can be further processed into secondary products such as 3D printer filaments (Mohammed et al., 2017 [10]). The mechanical recycling of E-waste plastics into secondary products is often determined by the purity of the E-waste plastics. However, the presence of heavy metals and BFRs negatively affects the purity of the E-waste plastics and thus leads to a shift towards chemical and thermal recycling approaches. In contrast to mechanical recycling, chemical, and thermal recycling technologies (e.g., incineration, hydrothermal treatment, and pyrolysis) generally convert heterogeneous and contaminated E-waste plastics into value-added chemicals and fuels.

Incineration can significantly reduce the volume of waste (i.e., 90-99% reduction in volume) being landfill and produce electricity at the same time (Arvanitoyannis, 2013 [11]). However, the high cost of the necessary installation and the emission of hazardous substances limit the widescale implementation of incineration for E-waste plastics. Emitted toxic substances include volatile and semi-volatile organic compounds (VOCs, e.g., chlorobenzene, bromobenzene, tribromomethane, bromomethane, and dibromomethane), dioxins, other halogenated compounds (e.g., HBr, HCl), and common flue gas components (Stewart et al., 2003 [12]).

Hydrothermal treatment is an effective approach to remove BFRs from E-waste plastics and convert them into value-added fuels and chemicals (Yin et al., 2011 [13]). For example, Zhao et al. (2019, [14]) hydrothermally treated E-waste plastics in subcritical water and converted them into 81.4-97.6 wt. % of organic product containing styrene, bisphenol A, caprolactam and other valuable compounds that can be reused to produce polymer or other chemicals. Aside from this organic product, solid product with a microstructure was also generated from the hydrothermal treatment of E-waste plastics, which demonstrates the potential to be used as absorbent. However, factors such as high installation cost, requirement for a high-pressure resistant reactor and handling of a pressurized reactor, limit the large-scale application of E-waste plastics recycling by hydrothermal treatment (Das et al., 2021 [2]).

Pyrolysis is a thermochemical recycling approach that can convert E-waste plastics into oil, solid and gas phases in an oxygen-free condition. Even though pyrolysis is effective in diverting E-waste plastics from landfill by their conversion into valuable products, the generation of wax during the process and the formation of halogenated gases such as HBr and HCl make pyrolysis less suitable for recycling contaminated E-waste plastics (Zhang et al., 2021 [15]). A catalyst has been introduced into pyrolysis in order to limit the formation of brominated components; however, issues such as occurrence of catalyst deactivation caused by Br fixation and coke formation, remain to be addressed before any widescale utilization of catalytic pyrolysis (Liu et al., 2014 [16]; Hall et al., 2008 [17]).

There is a need for environmental-friendly, efficient, and cost-effective processes for recycling E-waste plastic materials. Also, there is a need for such processes which can be performed at industrial level.

SUMMARY OF THE INVENTION

The inventors have designed and performed an environmental-friendly process for recycling contaminated solid materials including plastic materials such as electronic waste (E-waste) plastic materials. More specifically, the invention relates to such a process that uses a heating process including microwave-pyrolysis, and also uses a dehalogenation agent (DHA). The process according to the invention yields a solid phase, an oil phase, and a gas phase. The gas phase is further subjected to a purification treatment. The gas purification treatment according to the invention may be adapted for the purification of gases emitted from other processes.

In embodiments of the invention, the process comprises pre-treating a raw contaminated solid material then submitting the pre-treated material to a heating process such as microwave-pyrolysis for example yielding a solid phase, an oil phase, and a gas phase. The gas phase is further treated such as to remove unwanted components including acidic gases (halogenated gases), volatile organic compounds (VOCs), and sulfur-containing compounds such as sulfur oxides (SOx). Accordingly, the process of the invention leads to the production of a clean solid, an oil phase, and a purified gas phase.

In embodiments of the invention, each of the pre-treatment of the raw contaminated solid material and the purification treatment of the gas emitted during the heating process is performed using a dehalogenation agent (DHA) comprising an organophosphorus (OP) compound. The DHA agent used these two processes may be the same or different.

In embodiments of the invention, the DHA agent used is regenerated using a regeneration agent (RGA) and further re-used in the process.

In embodiments of the invention, the pre-treated material is mixed with a microwave absorber prior to performing the microwave-pyrolysis. The microwave absorber assists in the melting of the plastic material. In other embodiments of the invention, the melting process is preformed prior to the microwave-pyrolysis.

The process of the invention can be readily scaled up and performed in an industrial facility.

The invention thus provides the following in accordance with aspects thereof:

(1) A process for recycling contaminated solid material, comprising heating the material yielding a solid phase, an oil phase, and a gas phase, wherein the material is subjected to a pre-treatment involving a dehalogenation agent (DHA) prior to the heating.

(2) A process according to (1), wherein the heating is performed using a technique which is microwave-pyrolysis, ultrasound, electromagnetic waves at other frequencies than microwave frequencies, electric field, magnetic field, plasma, or a combination thereof.

(3) A process according to (1) or (2), further comprising subjecting the gas phase to a purification treatment involving a further dehalogenation agent yielding a purified gas and a reacted dehalogenation agent.

(4) A process according to (3), further comprising subjecting the reacted dehalogenation agent to a regeneration process yielding a regenerated dehalogenation agent.

(5) A process according to (4), wherein the regeneration process involves use of a regeneration agent comprising an acid compound or proton donor; optionally the acidic compound is an inorganic acid (HCl or $H_2SO_4$) or an organic acid.

(6) A process according to (4) or (5), wherein the regenerated dehalogenation agent is directed for re-use in the pre-treatment of the material and/or in the purification treatment of the gas phase.

(7) A process according to any one of (1) to (6), further comprising cleaning the contaminated solid material prior to the pre-treatment.

(8) A process according to any one of (1) to (7), wherein the pre-treatment of the material is conducted at ambient temperature or a higher temperature.

(9) A process according to (3), wherein the DHA used in the pre-treatment step and the further DHA used in the gas purification are the same or are different. In other words, in embodiments of the invention, a first DAH is used in the pre-treatment step and a second DHA agent is used in the gas purification step; and the first DHA and the second DHA may be the same or different.

(10) A process according to any one of (1) to (9), wherein the pre-treated material comprises reduced amounts of compounds containing Br, Cl, F, Co, and Pb when compared to an untreated material.

(11) A process according to (3), wherein the purified gas is substantially free of chemicals of concern (CoCs) including acidic gases, volatile organic compounds (VOCs), and sulfur-containing compounds; optionally the acidic gases are halogenated gases including HCl, HBr, and HF; optionally the VOCs are propylene, 1,3-butadiene, chloromethane, bromomethane, chloroethane, and vinyl chloride; optionally the sulfur-containing compounds are sulfur oxides (SOx).

(12) A process according to any one of (1) to (11), wherein the oil phase comprises monomers of degraded raw materials, which are classified into low boiling point oils such as gasoline (optionally in an amount of about 63.68%) and medium boiling point oils such as diesel (optionally in an amount of about 20.08%).

(13) A process for recycling a contaminated plastic material, comprising the steps of: (a) subjecting the material to a pre-treatment involving a dehalogenation agent (DHA) to yield a pre-treated material; (b) subjecting the pre-treated material to a heating process to yield a solid phase, an oil phase, and a gas phase; (c) separating the solid phase, the oil phase, and the gas phase; (d) subjecting the gas phase to a purification treatment involving a further dehalogenation agent (DHA) to yield a purified gas and a reacted DHA; (e) separating the purified gas and the reacted DHA; (f) subjecting the reacted DHA to a regeneration process to yield a regenerated DHA; and (g) directing the regenerated DHA for use at steps (a) and/or step (d).

(14) A process according to (13), wherein the DHA at step (a) and the further DHA at step (d) are the same or are different. In other words, in embodiments of the invention, a first DAH is used at step (a) and a second DHA agent is used at step (d); and the first DHA and the second DHA may be the same or different.

(15) A process according to any one of (1) to (14), wherein the dehalogenation agent comprises an organophosphorus compound.
(16) A process according to any one of (1) to (15), wherein the dehalogenation agent comprises a phosphoric acid ester of general formula I below

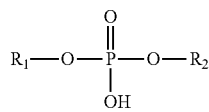

wherein $R_1$ and $R_2$ are each independently $C_1$ to $C_{20}$ a linear or branched, cyclic or non-cyclic, saturated or unsaturated alkyl group, optionally comprising a heteroatom which is O, S or N.
(17) A process according to (16), wherein $R_1$ and $R_2$ are each independently a $C_8$ to $C_{20}$ or a $C_8$ to $C_{16}$ or a $C_{16}$ a linear or branched, cyclic or non-cyclic, saturated or unsaturated alkyl group, optionally comprising a heteroatom which is O, S or N.
(18) A process according to any one of (1) to (17), wherein the dehalogenation agent comprises di-(2-ethylhexyl) phosphoric acid (DEHPA or HDEHP) outlined below

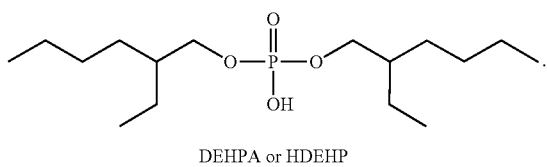 [SMILES: CCCCC(CC)COP(=O)(O)OCC(CC)CCCC]

DEHPA or HDEHP

(19) A process according to any one of (1) to (17), wherein the dehalogenation agent comprises a compound selected from the group consisting of: di-(2-ethylhexyl) phosphoric acid, bis(2-ethylhexyl) hydrophosphoric acid, di-(2-ethylhexyl) orthophosphoric acid, O,O-bis (2-ethylhexyl)phosphoric acid, orthophosphoric acid 2-ethylhexyl alcohol, phosphoric acid di(2-ethylhexyl) ester, and Hostarex PA 216™.
(20) A process according to any one of (1) to (19), which yields a clean solid material, an oil comprising monomers of the raw material, and a purified gas substantially free of acidic gases, volatile organic compounds, and sulfur-containing compounds.
(21) A process according to any one of (1) to (20), wherein the contaminated solid material is a contaminated plastic material.
(22) A process according to any one of (1) to (20), wherein the contaminated solid material is an electronic waste (E-waste) plastic material.
(23) A process according to any one of (1) to (20), wherein the heating is performed using microwave-pyrolysis.
(24) A process for recycling contaminated solid material, comprising subjecting the material to a microwave-pyrolysis yielding a solid phase, an oil phase, and a gas phase, wherein the material is subjected to a pre-treatment involving a dehalogenation agent (DHA) prior to the microwave-pyrolysis.
(25) A process according to (24), wherein a microwave absorber is added to the material prior to performing the microwave-pyrolysis; optionally the microwave absorber is a carbon-based compound such as SiC or carbon.
(26) A process according to (25), wherein the microwave absorber and the material are melted prior to performing the microwave-pyrolysis; optionally, melting is performed using a technique which is microwave heating, conventional heating, extrusion, or a combination thereof.
(27) A process according to any one of (24) to (26), wherein the contaminated solid material is a contaminated plastic material.
(28) A process according to any one of (24) to (26), wherein the contaminated solid material is an electronic waste (E-waste) plastic material.
(29) A process for purifying a gas emission, comprising allowing the gas emission to react with a dehalogenation agent (DHA) yielding a purified gas and a reacted DHA, and separating the purified and reacted DHA.
(30) A process according to claim, further comprising subjecting the reacted DHA to a regeneration process to yield a regenerated DHA.
(31) A process according to (30), further comprising re-using the regenerated DHA in the process.
(32) A process according to any one of (29) to (31), wherein the gas emission is from a facility for combustion of E-waste, organic waste, oil, or coal.
(33) A process according to any one of (29) to (31), wherein the gas emission is from a facility for recycling contaminated solid materials such as contaminated plastic material and contaminated electronic waste (E-waste) plastic materials.
(34) A system adapted to perform the process as defined in any one of (1) to (33).
(35) An industrial facility embodying the system as defined in (34).

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings.

(C) pre-treated feedstock obtained from pre-treatment using DHA at 60° C. (dashdot); (D) pre-treated feedstock obtained from pre-treatment using toluene-DHA (longdash).

Figure 9:
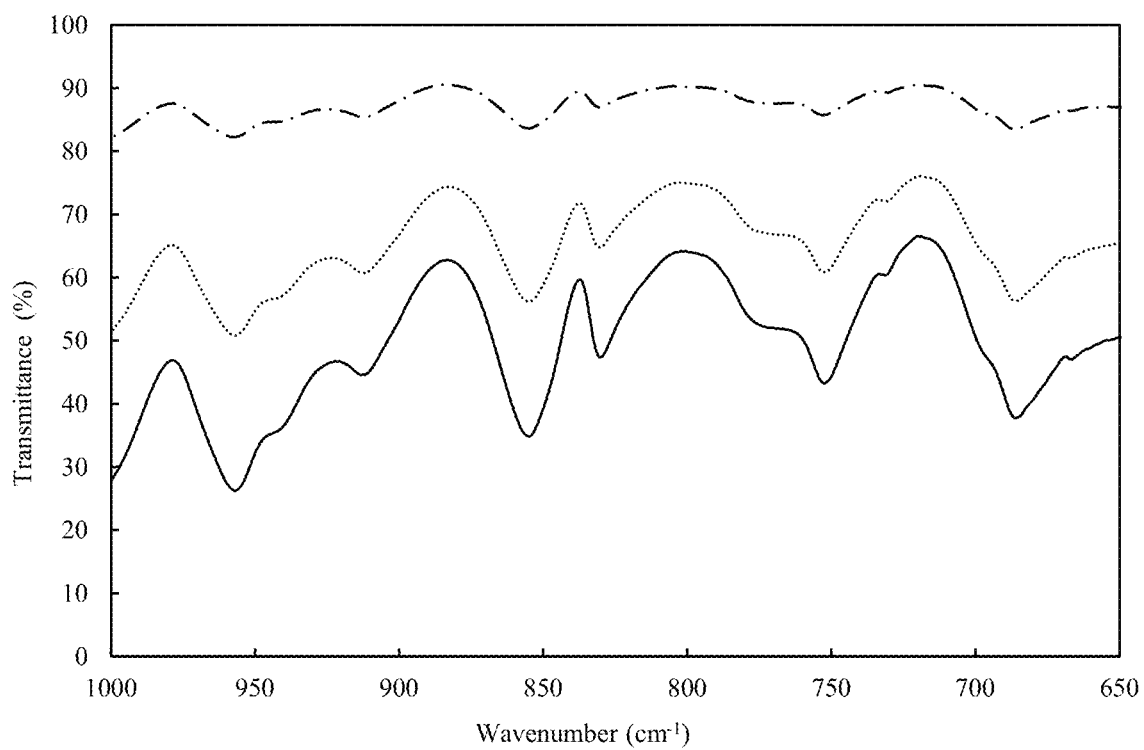

FIG. 9: FT-IR spectra of untreated (solid), pre-treated with ECOC (emulsion-containing organophosphoric compound) at 25° C. (dotted), and pre-treated with ECOC at 60° C. (dotdash) for 6 hours in the range of 650-1000 $cm^{-1}$.

Figure 10:
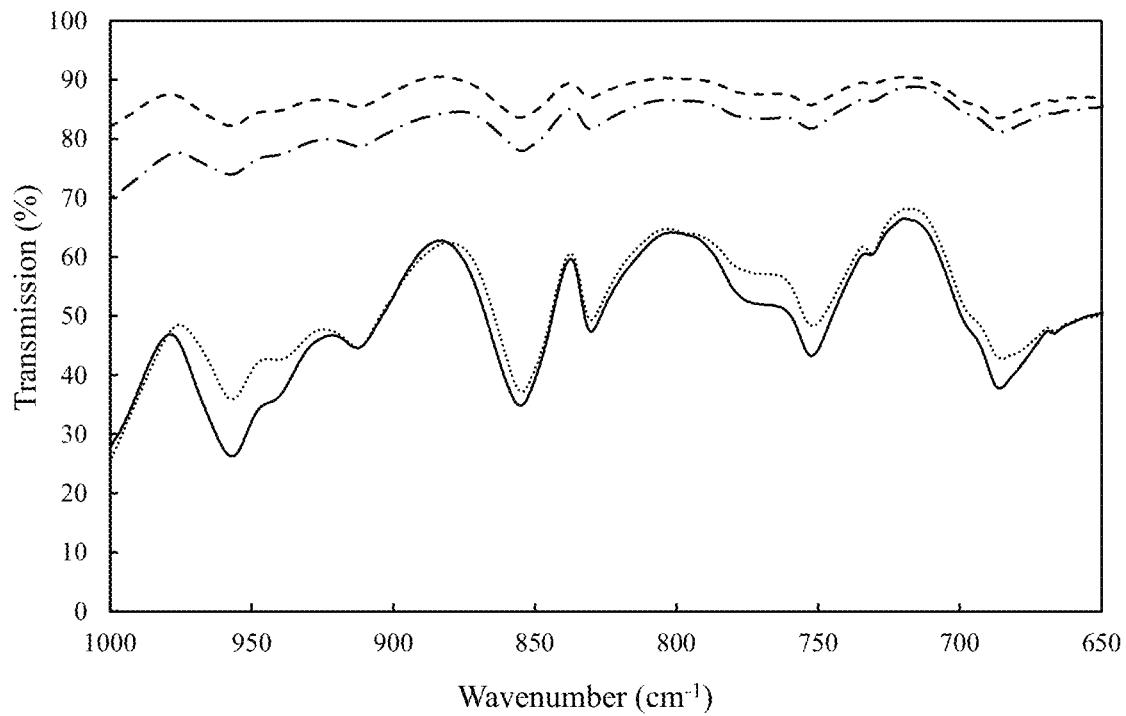

FIG. 10: FT-IR spectra of untreated (solid), treated with DHA for 2 hours (dotted), for 4 hours (dotdash), and for 6 hours (longdash) at 60° C. in the range of 650-1000 $cm^{-1}$.

Figure 11:
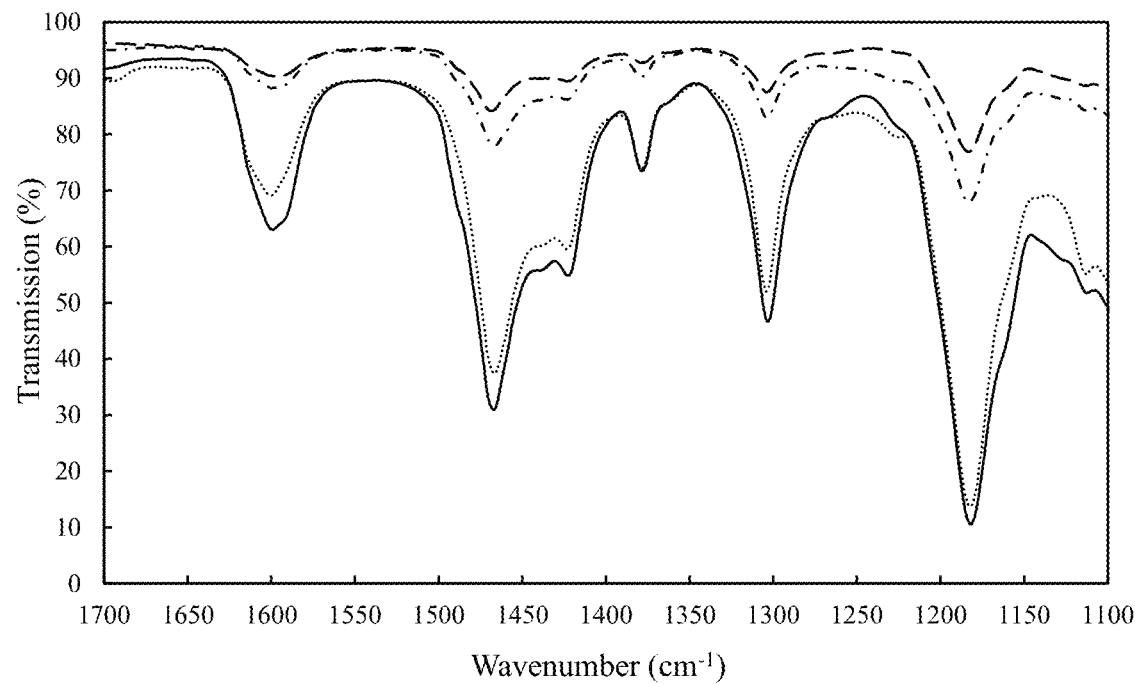

FIG. 11: FT-IR spectrum of untreated (solid), treated with ECOC for 2 hours (dotted), for 4 hours (dotdash), and for 6 hours (longdash) at 60° C. in the range of 1100-1700 $cm^{-1}$.

Figure 12:
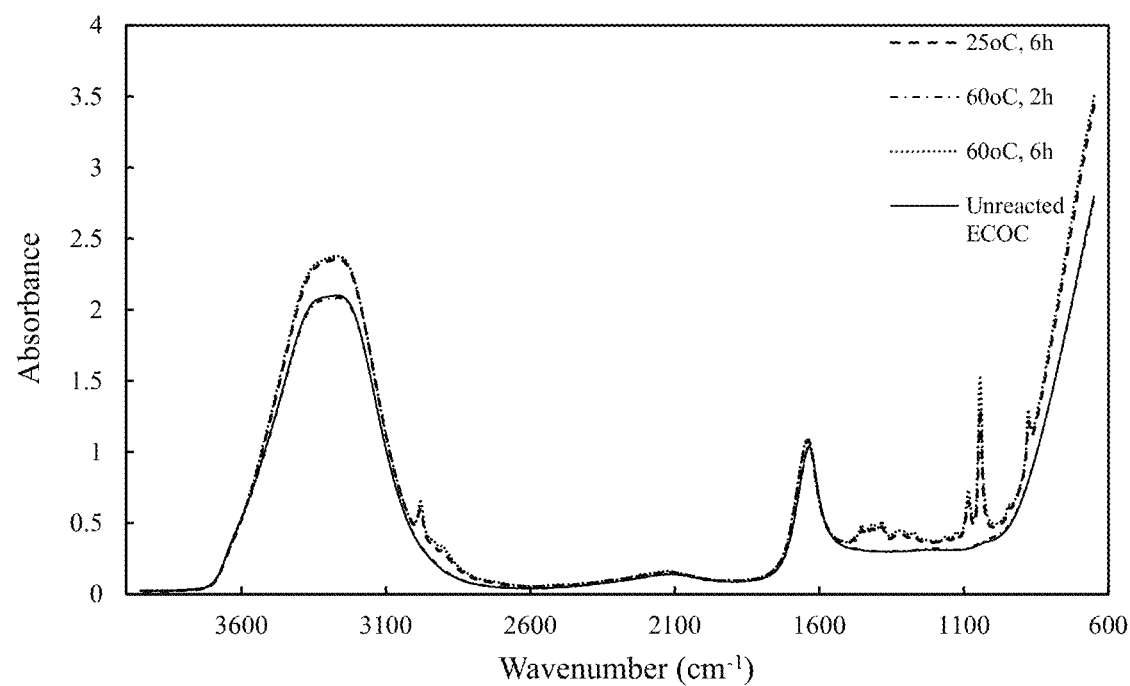

FIG. 12: FT-IR spectra of unreacted and reacted ECOC obtained from pre-treatment at various reaction conditions.

Figure 13:
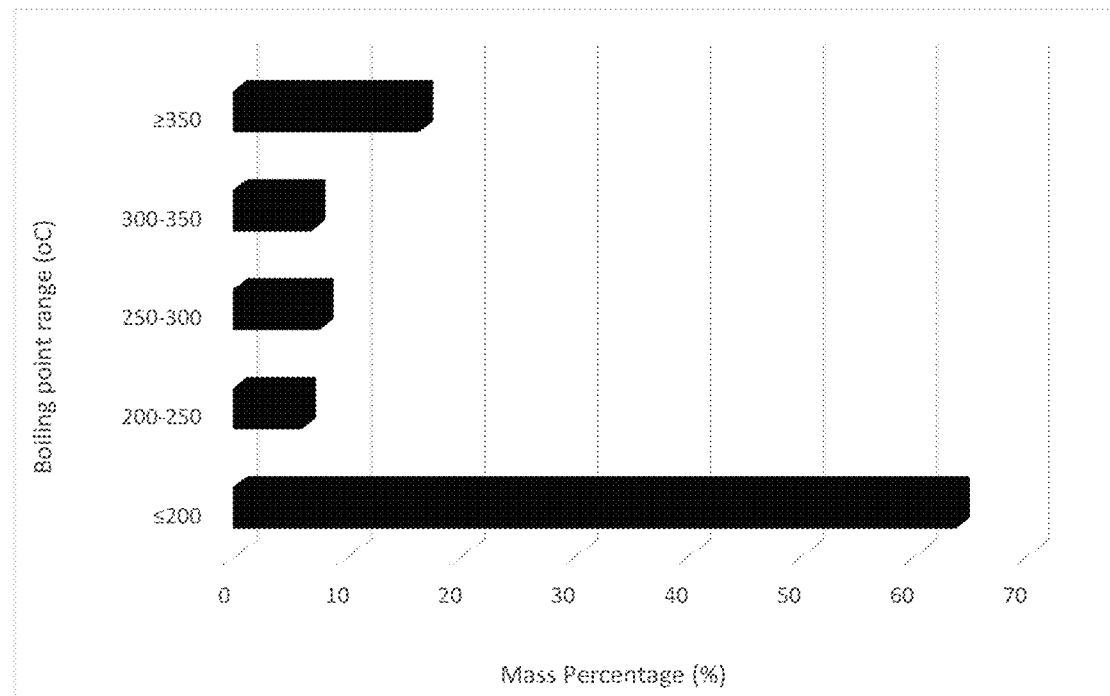

FIG. 13: The boiling point distribution of liquid oil obtained from microwave pyrolysis of E-waste plastics.

Figure 14:
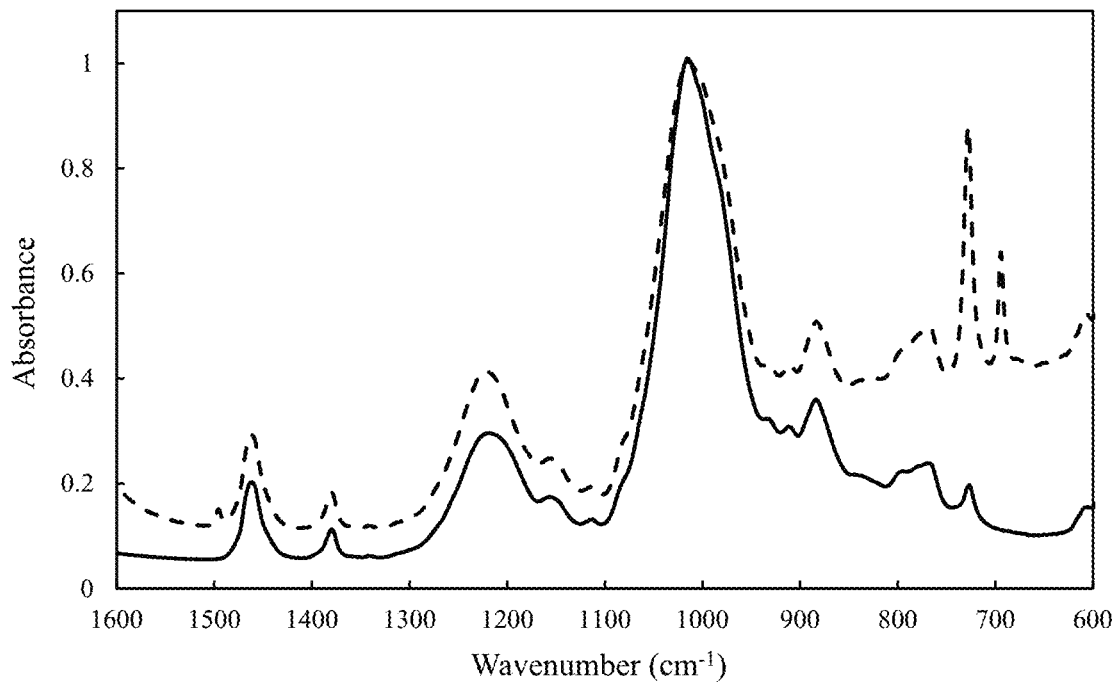

FIG. 14: FT-IR spectra of untreated (solid) and reacted (longdash) DHA obtained from DHA-assisted gas purification from 1600-600 $cm^{-1}$.

Figure 15:
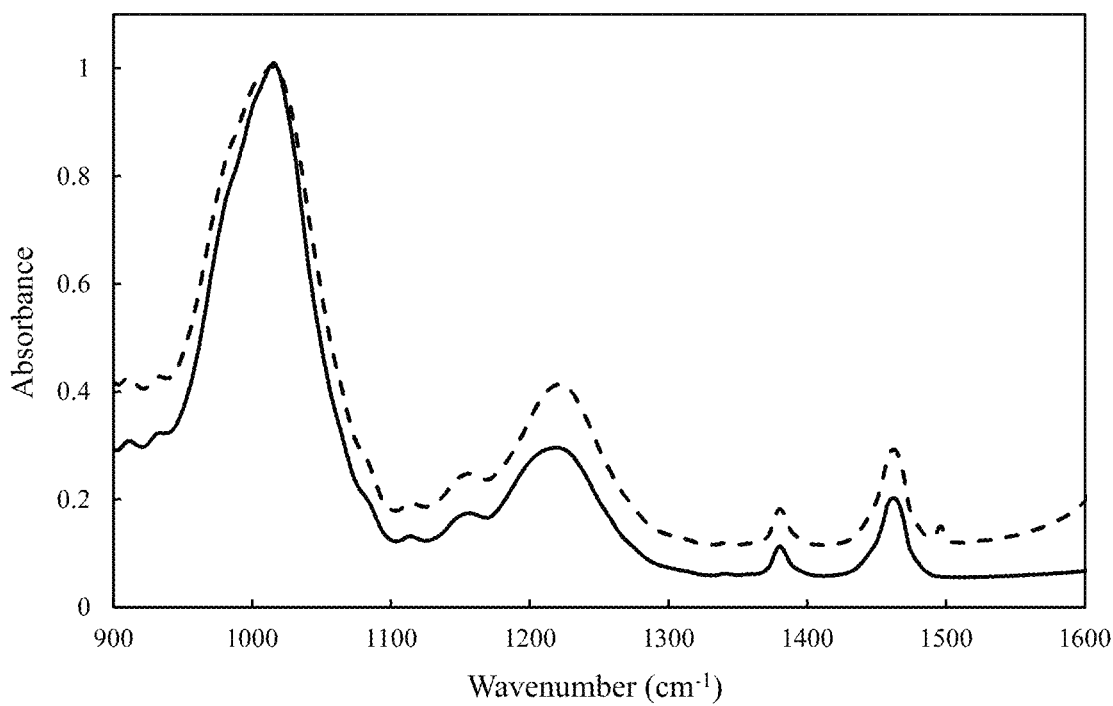

FIG. 15: FT-IR spectra of unreacted (solid) and reacted (longdash) DHA in the range of 1600-900 $cm^{-1}$.

Figure 16:
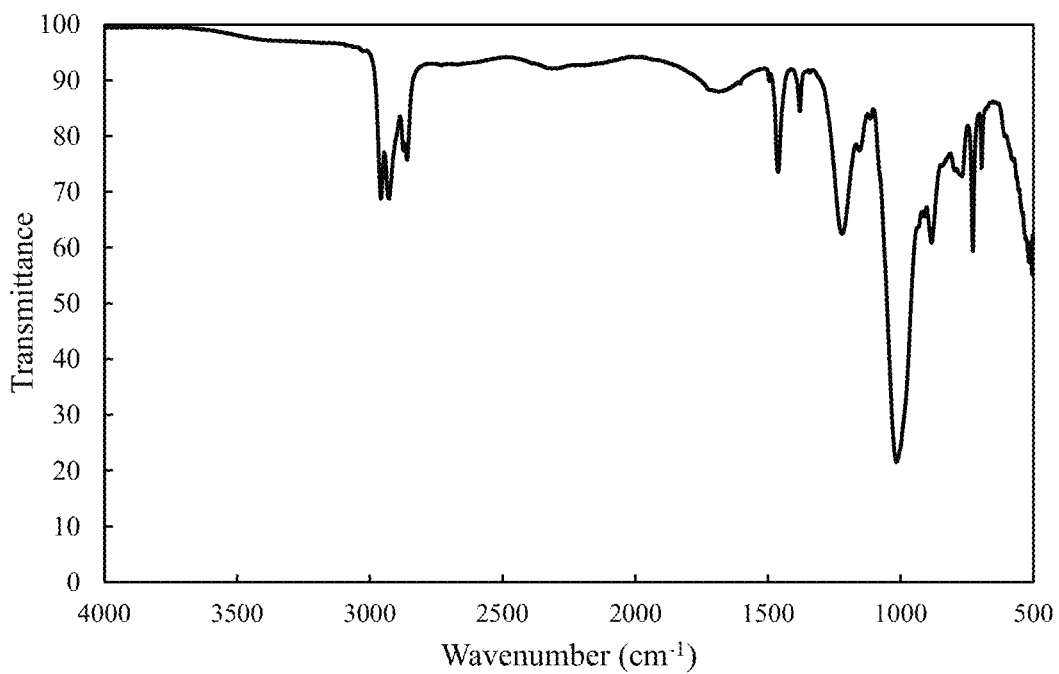

FIG. 16: FT-IR spectrum of regenerated DHA.

Figure 17:
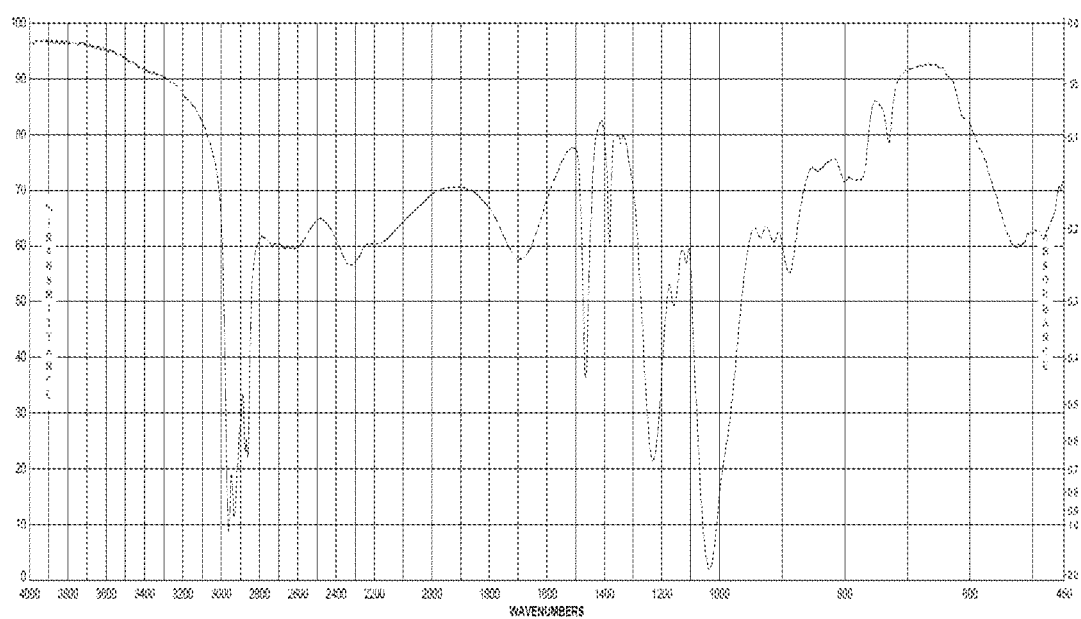

FIG. 17: FT-IR spectrum of fresh DHA (Millipore Sigma, 2021 [36]).

DESCRIPTION OF ILLUSTRATIVE EMBODIMENTS

Before the present invention is further described, it is to be understood that the invention is not limited to the particular embodiments described below, as variations of these embodiments may be made and still fall within the scope of the appended claims. It is also to be understood that the terminology employed is for the purpose of describing particular embodiments; and is not intended to be limiting. Instead, the scope of the present invention will be established by the appended claims.

In order to provide a clear and consistent understanding of the terms used in the present specification, a number of definitions are provided below. Moreover, unless defined otherwise, all technical and scientific terms as used herein have the same meaning as commonly understood to one of ordinary skill in the art to which this disclosure pertains.

Use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

As used herein when referring to numerical values or percentages, the term "about" includes variations due to the methods used to determine the values or percentages, statistical variance and human error. Moreover, each numerical parameter in this application should at least be construed in light of the number of reported significant digits and by applying ordinary rounding techniques.

As used herein, the term "dehalogenation agent" (DHA) refers to a chemical agent suitable for removing halogens and/or halogen-containing compounds from a material. In embodiments of the invention, the dehalogenation agent comprises an organophosphorus compound. In the present disclosure, term "emulsion-containing organophosphoric compound" (ECOC) is also used to designate the dehalogenation agent.

As used herein, the term "microwave-pyrolysis" refers to a pyrolysis process using a microwave heating technique.

As used herein, the term "microwave absorber" refers to material that absorbs microwaves and becomes heated. Such material is used in the microwave-pyrolysis and transfers its heat to the plastic material, thus assisting in the melting of the plastic material. Accordingly, a microwave absorber is used when the raw contaminated solid material contains plastic. Use of a microwave absorber may not be necessary when the raw material itself is a microwave absorber. The microwave absorber used is a carbon-based material such as for example SiC or carbon itself.

As used herein, the term "contaminated solid material" refers to the raw material used in the invention. The material may consist of any solid material that is contaminated and contains chemicals of concern (CoC) as defined herein below. Such solid materials include plastic materials and electronic waste plastic materials as defined herein below.

As used herein, the term "electronic waste (E-waste) plastic material" or "E-waste plastics" refers to the raw material used in this invention. The material consists of waste from various electronic equipment and contains chemicals of concern as defined herein above.

As used herein, the term "gas emission" refers to a gas stream emitted during the process of the invention. In particular, the gas emitted during the microwave-pyrolysis. The gas emission also refers to a gas emitted during any other process such as for example the combustion of E-waste, organic waste, oil or coal. It is to be understood that the gas purification treatment according to the invention may be applied to gases emitted during other processes.

As used herein, the term "chemicals of concern" (CoC) refers to chemicals present in the raw material used in the process of the invention. It is generally not desirable to have such chemicals present in solid materials discarded in the nature. Such chemicals are generally harmful to the nature or the health of humans. As indicated herein above, chemicals of concern comprise for example: acidic gases including halogenated gases such as HCl, HBr, and HF; volatile organic compounds (VOCs) including propylene, 1,3-butadiene, chloromethane, bromomethane, chloroethane, and vinyl chloride; and sulfur-containing compounds including sulfur oxides (SOx).

As used herein, the term "regeneration agent" (RGA) refers to a chemical used in the process of the invention to retrieve the dehalogenation agent (DHA) after use. The regeneration agent comprises a proton donor such as an acid. The acid may be inorganic (HCl, $H_2SO_4$) or organic.

The inventors have designed and performed a process for recycling contaminated solid materials including plastic materials such as electronic waste (E-waste) plastic materials. More specifically, the invention relates to such a process that uses a heating process including but not limited to microwave-pyrolysis. The process also uses a dehalogenation agent (DHA). The process according to the invention yields a solid phase, an oil phase, and a gas phase. The gas phase is further subjected to a purification treatment. The gas purification treatment according to the invention may be adapted for the purification of gases emitted from other processes.

The present invention is illustrated in further details in the Experiment Work section below. The section includes non-limiting examples.

Figure 1:
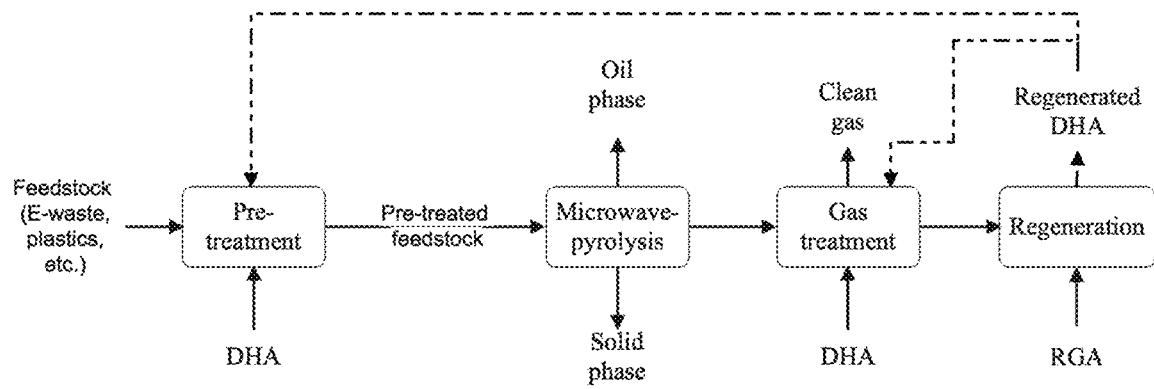
FIG. 1: Schematic diagram outlining the process according to the invention.

To tackle the E-waste plastic recycling problems as discussed herein above, the inventors have developed an environmental-friendly and energy-sufficient recycling approach consisting of a pre-treatment with an effective dehalogenation agent (DHA), a microwave-assisted pyrolysis, a gas purification with DHA, and a regeneration process. The end products obtained from this developed process include: the purified gas that meet the environmental regulation, the valuable monomers-containing oil phase, and the precious metals-containing solid phase. The schematic diagram of this proposed recycling solution for contaminated E-waste plastics is depicted in FIG. 1.

Example 1—Pre-Treatment

Due to the presence of debris on the raw feedstock, the feedstock initially underwent washing by water (if needed) and then dried, and then cut into pieces having a dimension of about 5 about. DHA solution was prepared by mixing an organophosphorus (OP) compound and distilled water. The DHA solution is also referred to herein as emulsion-containing organophosphoric compound (ECOC). In the experiments conducted, di-(2-ethylhexyl) phosphoric acid was used as OP. The OP dosage is between about 0.1 to 30 vol. %, preferably between about 1 to 10 vol. %, most preferably between about 1 to 5 vol. %. To evaluate the performance of DHA in removing chemical of concern (CoC) from E-waste plastics, another pre-treatment solution containing toluene and OP was prepared as the reference. This reference pre-treatment solution is referred to herein as toluene-ECOC. Indeed, it is suggested in the prior art that toluene is a common extracting agent used in the treatment of contaminated E-waste plastics (Evangelopoulos et al., 2019 [18]; Mnim et al., 2003 [19]; Schlummer et al., 2005 [20]).

Figure 2:
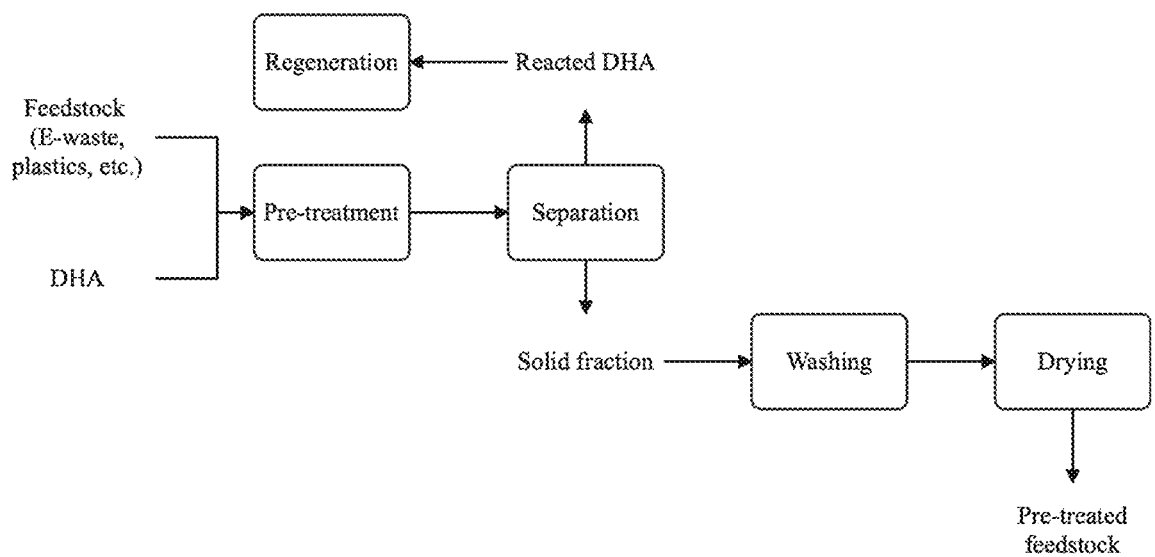
FIG. 2: Flow chart outlining the experimental procedure applied in the pre-treatment.

The flow chart for the experimental procedure used in the pre-treatment step is illustrated in FIG. 2. For a typical pre-treatment test, feedstock was mixed with pre-treatment solutions (ECOC or toluene-DHA) under constant stirring at 25° C. or 60° C. for a certain time, for example 2, 4, and 6 hours. At the end of the experiment, the solid and liquid fraction were separated. The liquid fraction, referred to herein as reacted ECOC, which was collected and stored for further analyses. The solid fraction was subjected to washing to remove any traces of ECOC, followed by drying.

Example 2—Microwave-Pyrolysis and Gas Purification

Figure 3:
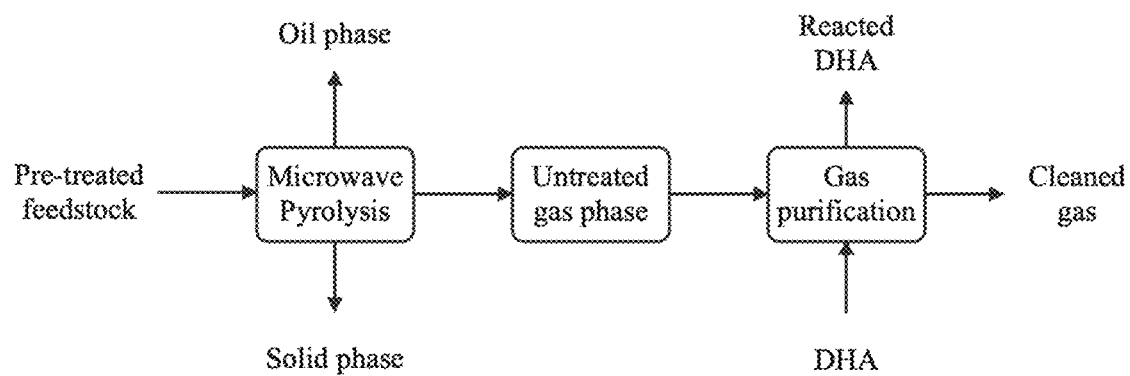
FIG. 3: Flow chart outlining the experimental procedure used in the microwave-pyrolysis and the gas purification step.

The flow chart for the experimental procedure used in the microwave pyrolysis and the gas purification is illustrated in FIG. 3. This is performed after on the pre-treated feedstock obtained from the pre-treatment. The microwave pyrolysis and subsequent gas purification were also performed on the untreated feedstock as reference.

Prior to the experiment, an inert gas such as nitrogen gas was purged into the reactor to remove any remaining oxygen inside the reactor thereby creating an environment which is substantially oxygen-free.

For a typical run, the feedstock and SiC were added into the reactor. A microwave with a maximum power of and frequency of 2.45 GHz was used for the pyrolysis experiments. The pyrolytic products were then passed through a series of condensers and the liquid oil was condensed and collected. The non-condensable gases also referred to herein as untreated gas were passed through a column containing ECOC to remove toxic substances including halogenated gases (HBr, HCl, and HF), VOCs and SOx. The duration of the microwave pyrolysis depends on the amount of material loaded. The duration may be about 5 minutes.

Example 3—Regeneration

The regeneration process for the reacted DHA obtained from the pre-treatment and also from the gas purification was carried out using a regeneration agent (RGA) which a proton donor such as an acid. The amount of RGA used was chosen to be equivalent to the amount of the DHA such as to ensure regeneration of a maximum amount of DHA. The RGA dosage is between about 0.1 to 30 vol. %, preferably between about 1 to 10 vol. %, most preferably between about 1 to 5 vol. %; and the duration of the regeneration process is about 1 to 30 minutes.

Figure 4:
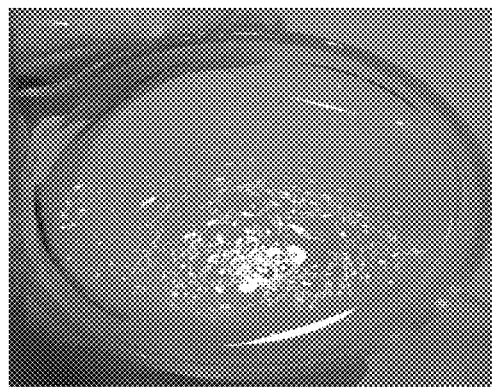
FIG. 4: Image showing the regenerated DHA floating on the surface of the liquid.

A known amount of the RGA was added to the reacted ECOC after treatment process. The mixture was then exposed to stirring to ensure the complete separation of the DHA from the contaminants. Once the exchange reaction was completed, separating the DHA is easily performed due to its immiscibility with water as can be seen in FIG. 4. The regenerated agent was then separated from the liquid and sent for analyzed.

Analysis

A series of analytical techniques were applied to fully characterized the main products and by-products at each stage of the process according to the invention. Table 1 below summarizes the analytical techniques applied for the characterizations.

TABLE 1

Summary of the analytical techniques used at each step.

| Products and by-products | Analytical techniques |
| --- | --- |
| Raw feedstock | NAA; SEM-EDX; FT-IR |
| Pre-treatment | |
| Pre-treated feedstock | SEM-EDX; FT-IR |
| Reacted DHA | FT-IR |
| Microwave-pyrolysis | |
| Oil phase | GC-MS; TGA |
| Untreated gas phase | FT-IR; Acidic gases; GC-MS (VOCs) |
| Gas purification | |
| Clean gas | FT-IR; Acidic gases; GC-MS (VOCs) |
| Reacted DHA | FT-IR |
| Regeneration | |
| Regenerated DHA | FT-IR |

Feedstock—NAA Analysis

The elemental composition of the untreated feedstock or raw feedstock identified by neutron activation analysis (NAA) is presented in Table 2 below. As can be seen, a high content of silicon was observed in the feedstock, which could be due to the presence of glass fiber substrates. It can also be seen that a high concentration of bromine in the feedstock, this might be attributed to the presence of BFRs in the E-waste. This feedstock also shows a high content of Na, Al, S, Cl, Fe, and Zn. The presence of glass fibers could cause the high concentration of Al and Fe since the preparation of glass fibers requires the addition of $Al_2O_3$ and $SiO_2$. In addition, some trace elements were identified in the feedstock including F, Mg, K, Ca, Sc, Ti, V, Cr, Mn, Co, Cu, As, Se, Rb, Zr, Mo, Ag, Cd, In, Sn, Sb, I, Cs, Ba, La, Au, and Hg. Among these elements, the presence of elements such as Ca, Mg, and Ba could be attributed to the fiber glass present in the feedstock (Gao et al., 2021 [21]). A low concentration of Sb was also detected in the feedstock. Indeed, this element is sometimes used as additive in the plastic matrix to enhance the effectiveness of flame retardants (Zhan et al., 2020 [22]).

TABLE 2

The elemental composition of the raw feedstock used in this project as determined by NAA analysis.

| Element | Concentration (ppm) | Element | Concentration (ppm) | Element | Concentration (ppm) |
|---|---|---|---|---|---|
| F | <920 | Fe | 2,000 ± 300 | Sn | <50 |
| Na | 2,050 ± 80 | Co | 37 ± 2 | Sb | 10.2 ± 0.4 |
| Mg | 600 ± 200 | Ni | <100 | I | <0.6 |
| Al | 32,000 ± 1,000 | Cu | 898 ± 50 | Cs | <0.8 |
| Si | 27,000 ± 7,000 | Zn | 1,940 ± 80 | Ba | 100 |
| Si | <15,000 | AS | <0.6 | La | 7.1 ± 0.3 |
| Cl | 2,500 ± 100 | Br | 1,090 ± 80 | Hf | <1 |
| K | <770 | Rb | <20 | W | <0.7 |
| Ca | <140 | Zr | <470 | Au | <0.02 |
| Se | <2 | Mo | <3 | Hg | <0.5 |
| Ti | 900 ± 100 | Ag | <510 | Mn | 1.9 ± 0.2 |
| V | 10 ± 1 | Cd | <4 | | |
| Cr | 14 ± 5 | In | <0.07 | | |

Feedstock—SEM-EDX Analysis

Figure 5:
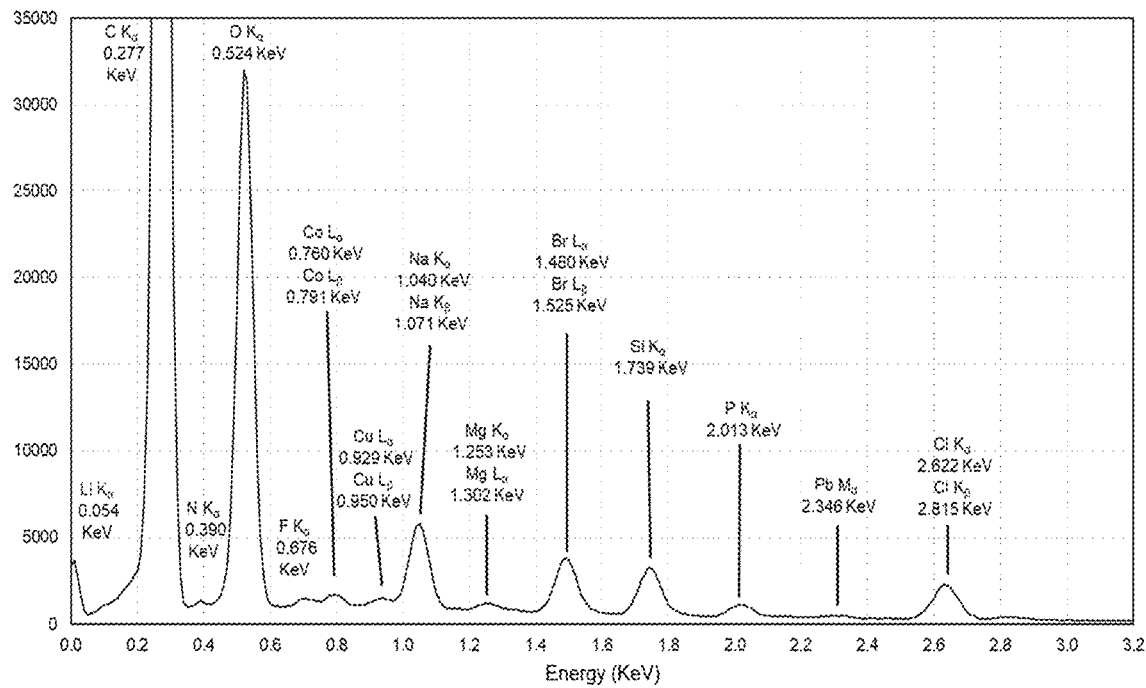
FIG. 5: SEM band characterization of the untreated heavy fraction plastic. Note: The Lithium band is associated with the X-ray detector window.

For SEM-EDX analysis of raw feedstock, two prominent peaks corresponding to C and O were detected; see FIG. 5. A weak peak that can be ascribed to N was found, which could be due to the fact the feedstock contains ABS polymer and this is further supported by the FT-IR analysis of raw material described herein below. Additionally, strong peaks representing Br and Cl were observed in the feedstock, as evidenced by the results obtained from NAA analysis. Other strong peaks corresponding to Si and Na were identified, owing to the presence of glass fiber in the feedstock. Except for these strong peaks, the peaks that can be ascribed to F, Co, Mg, and Pb were also observed.

Feedstock—FT-IR Analysis

Figure 6:
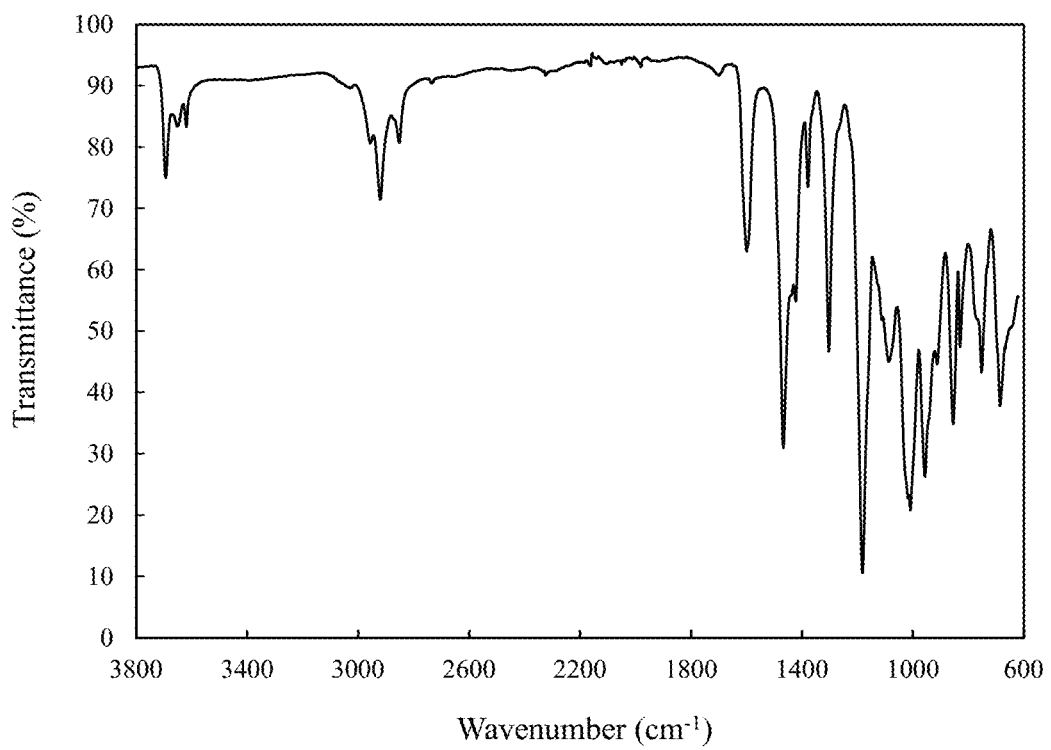
FIG. 6: FT-IR spectrum of the untreated feedstock.

FT-IR analysis of the raw feedstock was performed, the resulting spectrum is shown in FIG. 6. The peaks at 3693, 3647, and 3618 $cm^{-1}$ could be related to the O—H stretching. It was also found that the peaks at 2935 $cm^{-1}$, 2920 $cm^{-1}$, and 2851 $cm^{-1}$ were identified in the feedstock, which could be due to the aliphatic C—H. A peak that is attributed to the presence of C≡N bond can be observed at 2237 $cm^{-1}$, suggesting the presence of ABS polymer in the feedstock (Truc et al., 2017 [23]; Zhang et al., 2012 [24]). Besides, it was found that a peak corresponding to C=O stretching was observed at 1692 $cm^{-1}$. A strong peak at 1599 $cm^{-1}$ can be ascribed to the aromatic C=C vibration and a peak representing was found at 966 $cm^{-1}$. Together, these results could imply the presence of HIPS polymer in the feedstock (Truc et al., 2017 [23]). The peaks at 1467 $cm^{-1}$ and 1377 $cm^{-1}$ representing methylene group and methyl group, respectively, which are reported to be the characteristics bonds of PP (Zhang et al., 2012 [25]; Wagner et al., 2020 [26]). A strong peak was identified at 1303 $cm^{-1}$ and this could be ascribed to the C—F stretching (Limcharoen et al., 2013 [27]). Another peak at 1182 $cm^{-1}$ corresponding to C—O of esters can be identified in the feedstock, which implies the feedstock might contain PC (Annamalai et al., 2020 [28]). The peaks at 1080 $cm^{-1}$ and 667 $cm^{-1}$ could be ascribed to the presence of BFR in the feedstock (Grigorescu et al., 2020 [29]). A strong peak of epoxy group was found at 829 $cm^{-1}$ in the feedstock (Shen et al., 2018 [30]). Several peaks at 686 $cm^{-1}$ and 752 $cm^{-1}$ can be due to the presence of Pb—O—Pb and C—Cl bond in the feedstock, respectively.

Pre-Treatment—SEM-EDX Analysis

Figure 7:
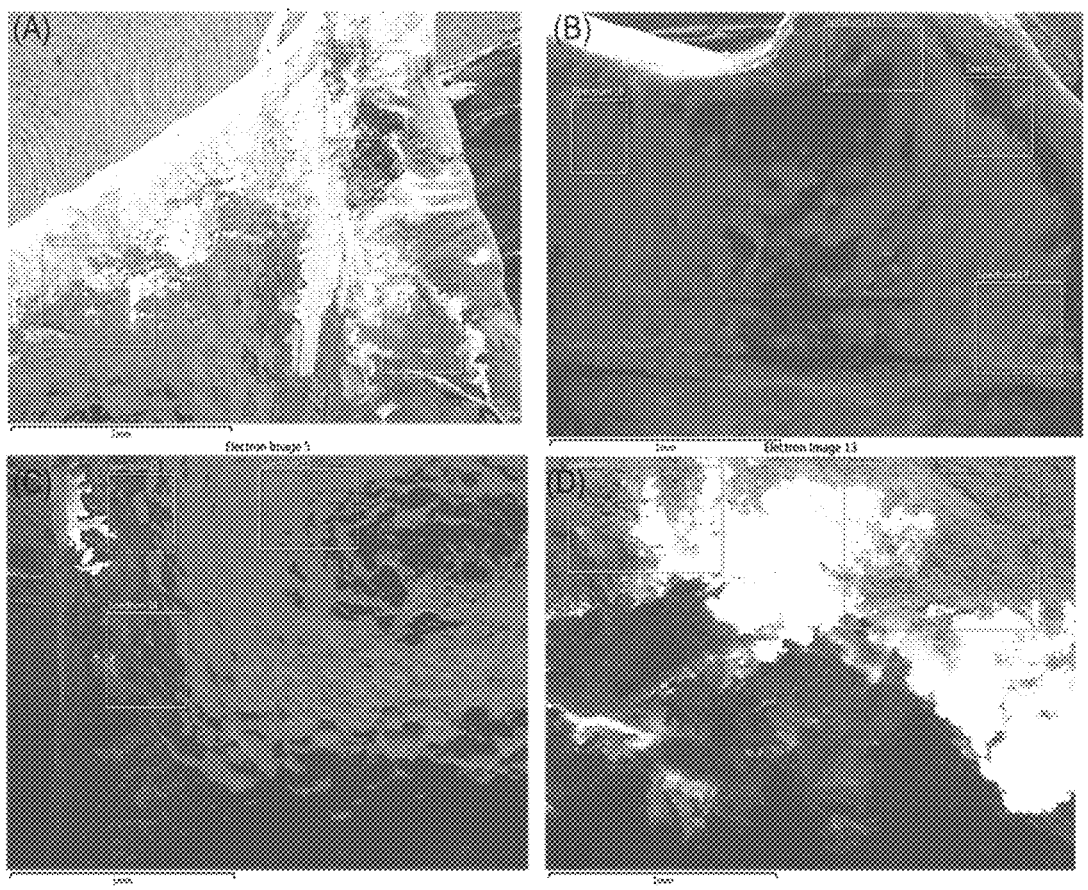
FIG. 7: SEM images of (A) untreated feedstock; (B) pre-treated feedstock obtained from pre-treatment using DHA at 25° C.; (C) pre-treated feedstock obtained from pre-treatment using DHA at 60° C.; (D) pre-treated feedstock obtained from pre-treatment using toluene-DHA.

The SEM images of pre-treated feedstock obtained at different conditions are shown in FIG. 7. The presence of a relatively lower chemical contrast in the pre-treated feedstock could indicate the removal of higher atomic number contaminants in the plastic matrix, such as Pb, Cd, Hg, Br, and Cl.

Figure 8:
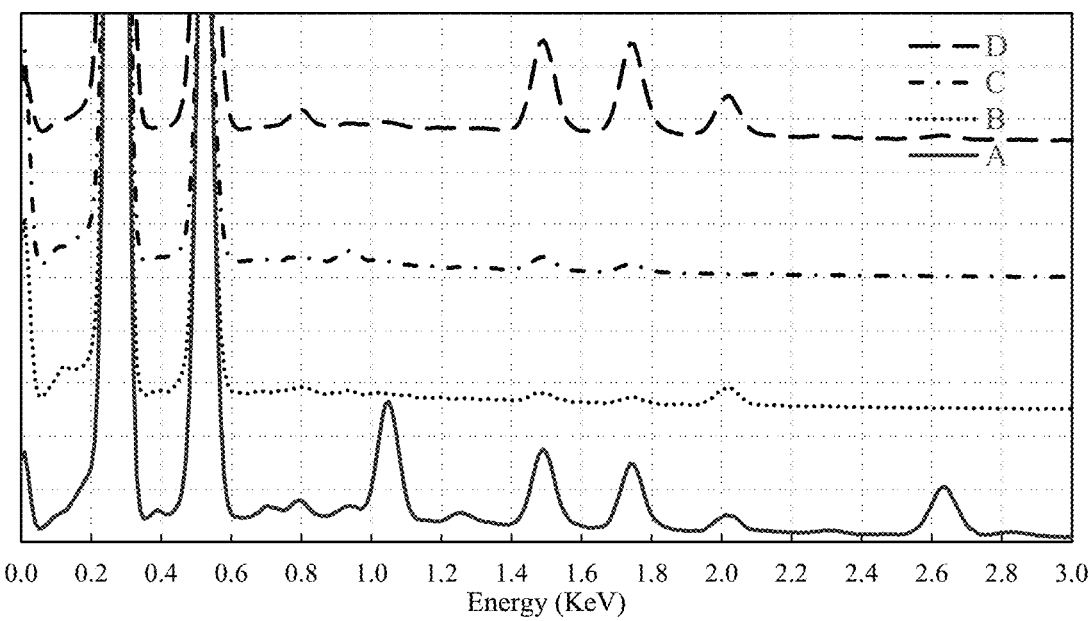
FIG. 8: Investigation on the removal efficiency of chemicals of concern with different pre-treatment conditions. (A) untreated feedstock (solid); (B) pre-treated feedstock obtained from pre-treatment using DHA at 25° C. (dotted)

FIG. 8 shows a reduction in the peak areas for all CoCs including F, Co, Br, Pb, and CO in the pre-treated feedstock obtained from pre-treatment using DHA solution (ECOC) at 25 or 60° C. On the contrary, no significant difference was found in the peak area of F, Br, and Pb of the pre-treated feedstock obtained from pre-treatment using toluene-DHA, and only a decrease in the peak area of Cl was found. Thus, it can be inferred that the removal efficiency of CoCs (i.e., F, Co, Br, Pb, and Cl) obtained from pre-treatment using ECOC was higher than that obtained from pre-treatment using toluene-DHA.

As illustrated in Table 3 below, the effect of reaction temperature on the removal efficiency of Co, F, Pb, and Br was insignificant. In contrast, the removal efficiency of Cl was proportional to the reaction temperature.

TABLE 3

Effect of reaction temperature on the removal efficiency of Co, F, Pb, and Br

| Temperature | Br | Cl | F | Co | Pb |
|---|---|---|---|---|---|
| 25° C. | 77 | 72 | 43 | 32 | 72 |
| 60° C. | 77 | 95 | 42 | 31 | 75 |

Clearly, as shown in Table 4 below, the pre-treatment removal efficiencies of Br, Cl, F, and Pb obtained from pre-treatment using DHA were higher compared to those obtained from pre-treatment using toluene-DHA. However, it was observed that the pre-treatment using toluene-DHA led to a higher removal efficiency of Co than that obtained using DHA at 25° C. but lower than that obtained using DHA at 60° C.

TABLE 4

Removal Efficiency of various chemicals of concern for different pre-treatment conditions.

| | Removal Efficiency (%) | | |
|---|---|---|---|
| Element | DHA, 25° C. | DHA, 60° C. | Toluene-DHA |
| Br | 73 | 74 | 0 |
| Cl | 94 | 93 | 71 |
| F | 43 | 42 | 28 |
| Co | 9 | 31 | 15 |
| Pb | 76 | 68 | 9 |

Pre-Treatment—FT-IR Analysis

The FT-IR spectra of untreated feedstock and pre-treated feedstock obtained at 25° C. for 6 hours and 60° C. for 6 hours in the range of 650-1000 $cm^{-1}$ are depicted in FIG. 9.

The intensity of the peak at 667 cm$^{-1}$ representing C—Br of feedstock reduced after pre-treatment using DHA. A peak at 957 cm$^{-1}$ was observed in the untreated feedstock and pre-treated feedstock, which could be related to the methylic C—Br stretching. Together with the reduced intensity of C—Br at 957 cm$^{-1}$, it can be stated that the DHA-assisted pre-treatment is helpful for removing Br from the contaminated E-waste plastics. This is supported by the SEM-EDX analysis where the Br removal obtained at DHA-assisted pre-treatment at 25° C. and 60° C. was 73% and 74%, respectively (Table 4). Another peak at 686 cm$^{-1}$ was detected in the untreated feedstock, which could be ascribed to the presence of Pb—O—Pb in the raw material. After DHA-assisted pre-treatment, it was found that the intensity of Pb—O—Pb bond reduced. Again, as indicated in Table 4, the Pb removal efficiency achieved by DHA-based pre-treatment was 68-76%. In addition, the peak corresponding to C—Cl bond was identified at 752 cm$^{-1}$, and its intensity was found to reduce after pre-treatment, which is consistent with the results obtained from SEM-EDX analysis. The peak of epoxy group was found at 829 cm$^{-1}$ in the untreated feedstock was stronger than that identified in the pre-treated feedstock. This lower intensity of epoxide group after pre-treatment could be due to the ring opening of epoxide in the acidic aqueous solution since the agent used is an acid. It is well known that epoxy resin is used to provide the protection for the electrical components against dust, moisture and short circuits.

The effect of reaction time on the CoC removal efficiency obtained from pre-treatment using DHA was investigated at 60° C. for 2, 4, and 6 hours. As shown in FIG. 10, no significant difference was observed between the spectrum of pre-treated feedstock obtained at 60° C. for 2 hours and untreated feedstock; however, a significant difference was found in the FT-IR spectrum of pre-treated feedstock when extending the processing time till 4 hours and 6 hours. The peak identified at 957 cm$^{-1}$ can be ascribed to the C—Br stretching, and its intensity was found to be reduced after pre-treatment, especially at 4 hours and 6 hours. A stronger peak of epoxy group was found at 829 cm$^{-1}$ in the untreated feedstock when compared with that of pre-treated feedstock obtained at 4 hours and 6 hours, which could be related to the ring-opening of epoxide in the pre-treatment. A similar observance was observed in the intensity of the C—Cl at 752 cm$^{-1}$ and Pb—O—Pb at 686 cm$^{-1}$.

The FT-IR spectra of the untreated and pre-treated feedstock obtained at 60° C. for 2 hours, 4 hours, and 6 hours in the range of 1100-1700 cm$^{-1}$ are presented in FIG. 11. As shown in FIG. 12(a), a weaker peak at 1303 cm$^{-1}$ representing C—F stretching was found in the pre-treated feedstock obtained at 4 hours and 6 hours compared to that in the untreated feedstock, implying the F was removed during the pre-treatment. This can be supported by a F removal efficiency of 42% was obtained at 60° C. for 6 hours (Table 4).

Pre-Treatment—Reacted DHA

FT-IR spectra of unreacted DHA and reacted DHA are presented in FIG. 12. No big difference can be observed in the FT-IR spectra of various reacted DHAs. A peak corresponding to C—F bond at 1040 cm$^{-1}$ was only found in the reacted DHA, indicating the occurrence of the reaction between DHA and F-containing compounds during the pre-treatment. It was found that a peak at 880 cm$^{-1}$ was absent in the unreacted DHA, which can be ascribed to C—Br bond. This phenomenon could suggest the reaction between DHA and Br-containing compounds during the pre-treatment, thereby reducing the Br concentration in the feedstock (Table 4). The peak representing C—O bond at 1084 cm$^{-1}$ was absent in the unreacted DHA. In addition, a strong peak representing O—H stretching was observed at 1637 cm$^{-1}$, which has been reported to be a main characteristic peak of DHA (de Silva et al., 2019 [31]). No significant difference was found in this peak before and after DHA-assisted pre-treatment, which may imply the high stability of DHA.

According to the FT-IR and SEM-EDX analyses of the pre-treated feedstock, it can be observed that DHA pre-treatment showed a positive role in removing Br, Cl, F, Co, and Pb from the contaminated E-waste plastics. In addition, based on the results obtained from the effect of temperature on the CoC removal efficiency obtained from DHA pre-treatment, this pre-treatment performed at room temperature led to a similar pre-treatment efficiency with that performed at higher temperatures (i.e., 60° C.). From the FT-IR analysis of reacted DHA, the high stability of DHA during the pre-treatment can be observed.

Microwave-Pyrolysis—GC-MS

The organic compounds in the pyrolysis oil were analyzed by GC-MS equipped with a HP-5MS capillary column. The main components of pyrolysis oil (with a relative peak area >1%) are summarized in Table 5 below. The components are classified in the table based on the structure characteristics (i.e., phenols, aromatic hydrocarbons excluding phenols, N-containing compounds, and others including compounds difficult to classify). It should be noted that only volatile compounds having a boiling point lower than 300° C. can be detected by the GC-MS. In general, a number of organic compounds can be detected in the pyrolysis oil from E-waste plastics, and some compounds can be utilized to produce other chemicals after separation. The results showed that no brominated compound was identified in the pyrolysis oil obtained. This can be explained as follows: the higher temperature was achieved in the microwave pyrolysis, leading to the decomposition of the brominated compounds such as 2-bromophenol and phenol 2,4-dibromo—which could be decomposed into small molecules such as bromomethane. The absence of the bromine-containing compounds ensures the low toxicity of the oil products.

TABLE 5

A summary of the main chemical compounds in the oil phase obtained from microwave pyrolysis of BFR-containing E-waste plastics.

| RT (min) | Area Percentage (%) | Compound | Formula |
|---|---|---|---|
| Aromatic hydrocarbons | | | |
| 2.96 | 2.05 | o-Xylene | $C_8H_{10}$ |
| 3.33 | 2.49 | Styrene | $C_8H_8$ |
| 4.16 | 1.09 | Benzene, 1,2,3-trimethyl- | $C_9H_{12}$ |
| 16.33 | 1.31 | Benz[a]anthracene, 7-methyl- | $C_{19}H_{14}$ |
| 22.98 | 1.63 | 5H-Tribenzo[a,f,k]trindene, 10,15-dihydro- | $C_{27}H_{18}$ |
| Phenols | | | |
| 4.46 | 12.13 | Phenol | $C_6H_6O$ |
| 5.47 | 11.63 | Phenol, 2-methyl- | $C_7H_8O$ |
| 5.90 | 2.09 | p-Cresol | $C_7H_8O$ |
| 6.20 | 14.22 | Phenol, 2,6-dimethyl- | $C_8H_{10}O$ |
| 6.92 | 12.65 | Phenol, 2,4-dimethyl- | $C_8H_{10}O$ |
| 7.18 | 2.30 | Phenol, 3,5-dimethyl- | $C_8H_{10}O$ |
| N-containing compounds | | | |
| 18.77 | 2.23 | Pyrrole-2-carboxaldehyde, 1-[1-(1-adamantyl)ethyl]- | $C_{17}H_{23}NO$ |
| 22.89 | 4.23 | Purin-2,6-dione, 1,3-dimethyl-8- | $C_{17}H_{18}N_4O_4$ |

TABLE 5-continued

A summary of the main chemical compounds in the oil phase obtained from microwave pyrolysis of BFR-containing E-waste plastics.

| RT (min) | Area Percentage (%) | Compound | Formula |
|---|---|---|---|
| | | [2-[3,4-dimethoxyphenyl]ethenyl]- Others | |
| 16.72 | 1.37 | 9,10-Anthracenedione, 1,2,6-trihydroxy- | $C_{14}H_8O_5$ |
| 17.67 | 1.49 | Benzoic acid, 2-(4-methylphenoxy)- | $C_{14}H_{12}O_3$ |
| 18.08 | 2.72 | (3-Methoxyphenyl) methanol, 2-methylbutyl ether | $C_{13}H_{20}O$ |
| 18.42 | 2.19 | 4,4'-Dimethoxybenzophenone | $C_{15}H_{14}O_3$ |
| 20.10 | 2.57 | Triphenyl phosphate | $C_{18}H_{15}O_4P$ |

Microwave Pyrolysis—TGA

TGA analysis of oil obtained from microwave-pyrolysis of contaminated E-waste plastics was conducted to estimate its boiling point distribution. A simulated boiling point graph of the oil is shown in FIG. 13 and six distinct boiling point ranges including: 0-150° C., 150-200° C., 200-250° C., 250-300° C., 300-350° C., and ≥350° C. were identified.

With microwave pyrolysis, the fraction with a boiling point below 150° C. (40.36%), 150-200° C. (23.32%), and above 350° C. (16.24%), represented as the main components identified in the liquid oil from E-waste plastics. In a comparison, Ye et al. (2018) [33] performed the pyrolysis of waste printed circuit board using conventional heating, and a higher fraction of heavy oil (32.30%) with a boiling point >350° C. was observed. FIG. 13 shows the two fractions of oil was 63.68% and 20.08%, which indicates the high value of the E-waste plastics-derived liquid oil obtained using microwave heating. In another previous study, the oil fraction with a boiling point lower than 200° C. obtained from conventional pyrolysis with the use of $Al_2O_3$ was significantly lower than that obtained by microwave pyrolysis without a catalyst (Wang et al., 2015 [32]). Thus, the effectiveness of microwave heating in terms of producing light oil fraction from E-waste plastics can be verified.

Gas Purification

As indicated herein above, the untreated gas phase obtained from the microwave-pyrolysis of contaminated E-waste plastics was purified using DHA to remove or eliminate halogenated gases (e.g., HCl, HBr, and HF), VOCs, sulfur-containing compounds, and others.

Acidic Gases—Analyses

The removal efficiency of HCl, HBr, and HF obtained from DHA-assisted gas purification was measured using NIOSH 7907 and 7906. The results are summarized in Table 6 below. Previous studies suggested that HBr is a common toxic gas generated from the thermal degradation of E-waste plastics ([8], [11], [26]). As indicated in Table 6, the concentration of HBr before and after the gas purification was lower than the detection limit of 0.15 ppm, which is considerably lower than the emission limit of 2.4 ppm. One possible reason could be the majority of Br existed in the form of bromomethane rather than HBr, as evidenced by the VOCs analysis. The results also showed that the concentration of HCl decreased from 2.2 ppm to <0.36 ppm after the gas purification treatment, and significantly lower than the emission limit of 18 ppm. Additionally, a sharp reduction in the HF concentration from 18 ppm to 0.74 ppm was observed after gas purification.

TABLE 6

Concentration of HF, HCl, and HBr before and after gas purification.

| Gases | Untreated gas (ppm) | Treated gas (ppm) | Limit (ppm) |
|---|---|---|---|
| HF | 18 | 0.74 | 2.4 |
| HCl | 2.2 | <0.36 | 18 |
| HBr | <0.15 | <0.15 | 2.4 |

VOCs—Analyses

The concentration of VOCs before and after gas purification was determined by EPA TO-15 and the results are shown in Table 7 below. As can be seen, the concentration of propylene decreased from 1,030,000 ppb to 4,240 ppb with a removal efficiency of 99.59%. Additionally, 1,3-butadiene which is one of the toxic substances and is a probable carcinogen in humans, had its concentration reduced dramatically from 255,000 ppb to 10,900 ppb with a removal efficiency of 95.73%. The chlorinated gases including $CH_3Cl$, $C_2H_5Cl$, and $C_2H_3Cl$ were almost removed in the gas purification stage. In addition, a removal efficiency of 98.25% was observed for $CH_3Br$ where the concentration reduced from 10,800 ppb to 189 ppb. This result could indicate that the Br from the gas phase obtained from microwave pyrolysis is likely to exist in the form of $CH_3Br$ rather than HBr, which could be used to explain a very low concentration of HBr in the untreated gas (<0.15 ppm), as shown in Table 6.

TABLE 7

The removal efficiency of selected VOCs obtained from DHA-assisted gas purification.

| VOCs | Untreated gas (ppb) | Treated gas (ppb) | Removal efficiency (%) |
|---|---|---|---|
| Propylene | 1,030,000 | 4,240 | 99.59 |
| 1,3-Butadiene | 255,000 | 10,900 | 95.73 |
| Chloromethane | 152,000 | 81 | 99.95 |
| Bromomethane | 10,800 | 189 | 98.25 |
| Chloroethane | 1,580 | 13 | 99.21 |
| n-Hexane | 890 | 500 | 43.82 |
| Vinyl chloride | 390 | 7.7 | 98.03 |

DHA—FT-IR Analysis

FT-IR analysis of unreacted and reacted DHA was performed, and the resulting spectra are presented in FIG. 14. The sharp peaks at 728 $cm^{-1}$ and 695 $cm^{-1}$ were observed in the reacted DHA, which could be attributed to the presence of C—Cl and C—Br, respectively; while these peaks were absent in the fresh or unreacted DHA. This result could suggest the reaction between DHA and Cl- and Br-containing compounds in the gas purification, thereby leading to a reduction in the concentration of $CH_3Br$ and $CH_3Cl$ (Table 7).

As can be seen in FIG. 15, the intensities of peaks centered at 1229 $cm^{-1}$ and 1033 $m^{-1}$ of unreacted and reacted DHA were similar. As suggested by Cortina et al. (1997, [34]) and Cheraghi et al. (2015, [35]), they are characteristic peaks of DHA, which are attributed to the presence of P=O stretching vibration at 1229 $cm^{-1}$ and P—O—H or P—O—C stretching vibration at 1033 $m^{-1}$. Therefore, the high stability of DHA during the gas purification is observed.

The regenerated DHA was characterized using FT-IR analysis, and compared with the FT-IR spectrum of fresh DHA. As can be seen in FIG. 16 and FIG. 17, the FT-IR spectrum of regenerated and fresh DHA was similar, indicating the effectiveness of the regeneration step.

As will be understood by a skilled person, the present invention provides an alternative and environmental-friendly recycling approach for contaminated E-waste plastics. The process according to the invention comprises a pre-treatment of the raw feedstock, a microwave-pyrolysis of the pre-treated feedstock, gas purification. The pretreatment and the gas purification comprise use of a dehalogenation agent which can be regenerated and re-used in the process. With the implementation of the present invention, emission of halogenated gases, VOCs and sulfur-containing compounds which are commonly observed in the thermal degradation of E-waste plastics can meet the environmental regulations.

The removal efficiency of chemicals of concern (CoC) obtained from DHA-assisted pre-treatment was found to be substantially higher than conventional approach (i.e., approaches using toluene). The pre-treatment using DHA resulted in higher removal efficiencies of Br, Cl, F, Co, and Pb. Indeed, the values obtained were respectively 73-74%, 93-94%, 42-43%, 9-31%, and 68-76% which are higher than those obtained using toluene-DHA (Br: 0%; Cl: 71%; F: 28%; Co: 15%; and Pb: 9%).

According to the invention, it is possible to conduct DHA pre-treatment at room temperature without negatively affecting the CoC removal efficiency.

The major fractions of oil product obtained from the microwave-pyrolysis of E-waste plastics according to the invention were classified into low boiling point oils such as gasoline (63.68%) and medium boiling point oils such as diesel (20.08%).

DHA-assisted gas purification reduced the amounts of HF and HCl, from 18 ppm to 0.74 ppm and from 2.2 ppm to <0.36 ppm, respectively; and the concentration of HBr was below 0.15 ppm. Accordingly, the gas purification according to the invention is effective in removing acidic gases including HF, HCl, and HBr.

Regarding VOCs removal efficiency, the DHA-assisted gas purification according to the invention led to removal efficiencies of 95.73%, 99.95%, 98.25%, 99.21%, and 98.03% for 1,3-butadiene, chloromethane, bromomethane, chloroethane, and vinyl chloride, respectively.

In embodiments of the invention, the microwave may be applied at a frequency range between about 915 MHz to about 2450 GHz. As will be understood by a skilled person, other heating techniques than microwave may be used in the process. Such heating techniques may be for example induction heating, ultrasound, electromagnetic waves at other frequencies than microwave frequencies, electric field, magnetic field, plasma, or combinations thereof.

The process according to the invention embodies a system for performing the process and may be readily scaled up and integrated in an industrial facility. As will be understood by a skilled person, such system and facility are within the scope of the present invention.

In embodiments of the invention, the process may be batch operated, semi-batch operated, continuous flow operated, or combinations thereof. Also, in embodiments of the invention, the process may be s small scale, medium scale, large scale, or combinations thereof.

The scope of the claims should not be limited by the preferred embodiments set forth in the examples; but should be given the broadest interpretation consistent with the description as a whole.

The present description refers to a number of documents, the content of which is herein incorporated by reference in their entirety.

REFERENCES

[1] Forti V, Balde C P, Kuehr R, Garam B. 2020. The global E-waste monitor 2020: quantities, flows and the circular economy potential. United Nations University/United Nations Institute for Training and Research, International Telecommunication Union, and International Solid Waste Association.

[2] Das P, Gabriel J C P, Tay C Y, Lee J M. 2021. Value-added products from thermochemical treatments of contaminated e-waste plastics. Chemosphere. 269, 129409.

[3] Damrongsiri S, Vassanadumrongdee S, Tanwattana P. 2016. Heavy metal contamination characteristic of soil in WEEE (waste electrical and electronic equipment) dismantling community: a case study of Bangkok, Thailand. Environmental Science and Pollution Research. 23, 17026-17034.

[4] Debnath B, Chowdhury R, Ghosh S K. 2018. Sustainability of metal recovery from E-waste. Frontiers of Environmental Science & Engineering. 12, 2.

[5] Kefeni K K, Okonkwo J O, Olukunle O I, Botha B M. 2011. Brominated flame retardants: sources, distribution, exposure, pathways, and toxicity. Environmental Reviews. 19, 238-253.

[6] Olubanjo K, Osibanjo O, Chidi Ni. 2015. Evaluation of Pb and Cu contents of selected component parts of waste personal computers. Journal of Applied Sciences and Environmental Management. 19, 470-477.

[7] Ortuño N, Moltó J, Conesa J A, Font R. 2014. Formation of brominated pollutants during the pyrolysis and combustion of tetrabromobisphenol A at different temperatures. Environmental Pollution. 191, 31-37.

[8] Wong M H, Wu S C, Deng W J, Yu X Z, Luo Q, Leung A O W, Wong C S C, Luksemburg W J, Wong A S. 2007. Export of toxic chemicals—a review of the case of uncontrolled electronic-waste recycling. Environmental Pollution. 149, 131-140.

[9] Lilienthal H, van der Ven L T M, Piersma A H, Vos J G. 2009. Effects of the brominated flame retardant hexabromocyclododecane (HBCD) on dopamine-dependent behavior and brainstem auditory evoked potentials in a one-generation reproduction study in Wistar rats. Toxicology Letters. 185, 63-72.

[10] Mohammed M I, Mohan M, Das A, Johnson M D, Singh P B, McLean D, Gibson I. 2017. A low carbon footprint approach to the reconstitution of plastics into 3D-printer filament for enhanced waste reduction. The International Conference on Design and Technology. 234-241.

[11] Arvanitoyannis I S. 2013. Waste management for polymers in food packaging industries. In: Plastic films in food packaging. William Andrew Publishing, Oxford.

[12] Stewart E, Lemieux P. 2003. Emission from the incineration of electronics industry waste. IEEE International Symposium on Electronics and the Environment. 271-275.

[13] Yin J, Li G, He W, Huang J, Xu M. 2011. Hydrothermal decomposition of brominated epoxy resin in waste printed circuit boards. Journal of Analytical and Applied Pyrolysis. 92, 131-136.

[14] Zhao X Y, Xia Y H, Zhan L, Xie B, Gao B, Wang J L. 2019. Hydrothermal treatment of e-waste plastics for tertiary recycling: product slate and decomposition mechanisms. ACS Sustainable Chemistry & Engineering. 7, 1464-1473.
[15] Zhang T H, Mao X, Qu J S, Liu Y, Siyal A A, Ao W Y, Fu J, Dai J J, Jiang Z H, Deng Z Y, Song Y M, Wang D Y, Polina C. 2021. Microwave-assisted catalytic pyrolysis of waste printed circuit boards, and migration and distribution of bromine. Journal of Hazardous Materials. 402, 123749.
[16] Liu M, Zhuo J K, Xiong S J, Yao Q. 2014. Catalytic degradation of high-density polyethylene over a clay catalyst compared with other catalysts. Energy Fuels, 28, 6038-6045.
[17] Hall W J, Miskolczi N, Onwudili J, Williams P T. 2008. Thermal processing of toxic flame-retarded polymer using a waste fluidized catalytic cracker (FCC) catalyst. Energy Fuels. 22, 1691-1697.
[18] Evangelopoulos P, Arato S, Persson H, Kantarelis E, Yang W. 2019. Reduction of brominated flame retardants (BFRs) in plastics from waste electrical and electronic equipment (WEEE) by solvent extraction and the influence on their thermal decomposition. Waste Management. 94, 165-171.
[19] Mnim A A, Wolf M, van Eldik R. 2003. Extraction of brominated flame retardants from polymeric waste material using different solvents and supercritical carbon dioxide. Analytica Chimica Acta. 491, 111-123.
[20] Schlummer M, Brandl F, Maurer A, van Eldik R. 2005. Analysis of flame retardant additives in polymer fractions of waste of electric and electronic equipment (WEEE) by means of HPLC-UV/MS and GPC-HPLC-UV. Journal of Chromatography A. 1064, 39-51.
[21] Gao R T, Liu B Y, Zhan L, Guo J, Zhang J, Xu Z M. 2021. Catalytic effect and mechanism of coexisting copper on conversion of organics during pyrolysis of waste printed circuit boards. Journal of Hazardous Materials. 403, 123465.
[22] Zhan L, Zhao X Y, Ahmad Z, Xu Z M. 2020. Leaching behavior of Sb and Br from E-waste flame retardant plastics. Chemosphere. 245, 125684.
[23] Truc N T T, Lee B K. 2017. Selective separation of ABS/PC containing BFRs from ABSs mixture of WEEE by developing hydrophilicity with ZnO coating under microwave treatment. Journal of Hazardous Materials. 329, 84-91.
[24] Zhang C C, Zhang F S. 2012. Removal of brominated flame retardant from electrical and electronic waste plastic by solvothermal technique. Journal of Hazardous Materials. 221-222, 193-198.
[25] Zhang J, Zhang L, Suttonn D, Wang X G, Lin T. 2012. Needleless melt-electrospinning of polypropylene nanofibers. Journal of Nanomaterials. 2012, 382639.
[26] Wagner F, Peeters J R, Ramon H, Keyzer J D, Duflou J R, Dewulf W. Quality assessment of mixed plastic flakes from waste electrical and electronic equipment (WEEE) by spectroscopic techniques. Resources, Conversion and Recycling. 158, 104801.
[27] Limcharoen A, Limsuwan P, Pakpum C, Siangchaew K. 2013. Chacterization of C—F polymer film formation on the air-bearing surface etched sidewall of fluorine-based plasma interaction with $Al_2O_3$—TiC substrate. Journal of Nanomaterials. 2013, 851489.
[28] Annamalai M, Gurumurthy K. 2020. Characterization of end-of-life mobile phone printed circuit boards for its elemental composition and beneficiation analysis. Journal of the Air & Waste Management Association. 315-327.
[29] Grigorescu R M, Ghioca P, Iancu L etc. 2020. Development of thermoplastic composites based on recycled polypropylene and waste printed circuit boards. Waste Management. 118, 391-401.
[30] Shen Y F, Chen X M, Ge X L, Chen M D. 2018. Chemical pyrolysis of E-waste plastics: char characterization. Journal of Environmental Management. 214, 94-103.
[31] de Silva F N, Bassaco M M, Bertuol D A, Tanabe E H. 2019. An eco-friendly approach for metals extraction using polymeric nanofibers modified with di-(2-ethylhexyl) phosphoric acid (DEHPA). Journal of Cleaner Production. 210, 786-794.
[32] Wang Y, Sun S Y, Yang F, Li S Y, Wu J Q, Liu J Y, Zhong S, Zeng J J. 2015. The effects of activated Al2O3 n the recycling of light oil from the catalytic pyrolysis of waste printed circuit boards. Process Safety and Environmental Protection. 98, 276-284.
[33] Ye Z W, Yang F, Qiu Y Q, Chen N W, Lin W X, Sun S Y. 2018. The dibrominated and lightweight oil generated from two stage pyrolysis of WPCBs by using compound chemical additives. Process Safety and Environmental Protection. 116, 654-662.
[34] Cortina J L, Miralles N, Aguilar M. 1997. Solid-liquid extraction studies of divalent metals with impregnated resins containing mixtures of organophosphorous extractants. Reactive and Functional Polymers. 32, 221-229.
[35] Cheraghi A, Ardakani M S, Alamdari E K, Fatmesari D H, Darvishih D, Sadrnezhaad S K. 2015. Thermodynamics of vanadium (V) solvent extraction by mixture of D2EHPA and TBP. International Journal of Mineral Processing. 138, 49-54.
Millipore Sigma (2021). Bis(2-ethylhexyl) phosphate FTIR. https://www.sigmaaldrich.com/spectra/ftir/FTIR003572.PDF. Accessed at Apr. 21, 2021.

The invention claimed is:

1. A process for recycling contaminated plastic material, comprising heating the material yielding a solid phase, an oil phase, and a gas phase, wherein:
   the plastic material is subjected to a pre-treatment involving an emulsion containing organophosphorus compound (ECOC) at a temperature of about 25° C. to about 60° C. for a time period of up to 6 hours, thereby removing chemicals of concern (CoCs) and dehalogenating halogenated compounds, to obtain the pre-treated plastic material which is substantially free of CoCs and halogenated compounds; and
   the heating is performed using microwave-pyrolysis, and a chemically inert microwave absorber which is SiC is added to the pre-treated plastic material, thereby thermally decomposing the plastic.

2. The process according to claim 1, further comprising subjecting the gas phase to a purification treatment involving a further ECOC yielding a purified gas and a reacted ECOC.

3. The process according to claim 2, wherein:
   the process further comprises subjecting the reacted ECOC to a regeneration process yielding a regenerated ECOC and/or;
   the regeneration process involves use of a regeneration agent comprising an acid compound or proton donor; optionally the acidic compound is an inorganic acid which is HCl or $H_2SO_4$, or an organic acid; and/or
   the regenerated ECOC is directed for re-use in the pre-treatment of the material and/or in the purification treatment of the gas phase; and/or
   the process further comprises cleaning the contaminated solid material prior to; the pre-treatment.

4. The process according to claim 2, wherein the ECOC used in the pre-treatment step and the further ECOC used in the gas purification are the same or are different.

5. The process according to claim 1, wherein:
the pre-treated material comprises reduced amounts of compounds containing Br, Cl, F, Co, and Pb when compared to an untreated material.

6. A process for recycling a contaminated plastic material, comprising the steps of:
    (a) subjecting the material to a pre-treatment involving an emulsion containing organophosphorus compound (ECOC) to yield a pre-treated plastic material;
    (b) subjecting the pre-treated plastic material to a heating process to yield a solid phase, an oil phase, and a gas phase;
    (c) separating the solid phase, the oil phase, and the gas phase;
    (d) subjecting the gas phase to a purification treatment involving a further ECOC to yield a purified gas and a reacted ECOC;
    (e) separating the purified gas and the reacted ECOC;
    (f) subjecting the reacted ECOC DHA to a regeneration process to yield a regenerated ECOC; and
    (g) directing the regenerated ECOC for use at steps (a) and/or step (d),
wherein step (a) is performed at a temperature of about 25° C. to about 60° C. for a time period of up to 6 hours, thereby removing chemicals of concern (CoCs) and dehalogenating halogenated compounds, to obtain the pre-treated plastic material which is substantially free of CoCs and halogenated compounds;
and wherein the heating is performed using microwave-pyrolysis, and a chemically inert microwave absorber which is SiC is added to the pre-treated plastic material, thereby thermally decomposing the plastic.

7. The process according to claim 1, wherein the ECOC comprises a phosphoric acid ester of general formula I below

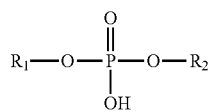

I wherein $R_1$ and $R_2$ are each independently $C_1$ to $C_{20}$ a linear or branched, cyclic or non-cyclic, saturated or unsaturated alkyl group, optionally comprising a heteroatom which is O, S or N;
optionally $R_1$ and $R_2$ are each independently a $C_8$ to $C_{20}$ or a $C_8$ to $C_{16}$ or a $C_{16}$ a linear or branched, cyclic or non-cyclic, saturated or unsaturated alkyl group, optionally comprising a heteroatom which is O, S or N.

8. The process according to claim 1, wherein the ECOC comprises di-(2-ethylhexyl) phosphoric acid (DEHPA or HDEHP) outlined below

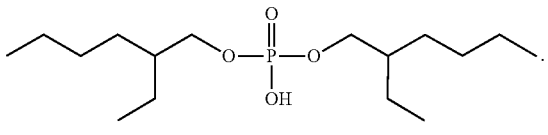

DEHPA or HDEHP

9. The process according to claim 1, wherein the ECOC comprises a compound selected from the group consisting of: di-(2-ethylhexyl) phosphoric acid, bis(2-ethylhexyl) hydrophosphoric acid, di-(2-ethylhexyl) orthophosphoric acid, O,O-bis(2-ethylhexyl) phosphoric acid, orthophosphoric acid 2-ethylhexyl alcohol, phosphoric acid di (2-ethylhexyl) ester, and Hostarex PA 216™.

10. The process according to claim 1, wherein the contaminated plastic material is an electronic waste (E-waste) plastic material.

11. The process according to claim 1, wherein:
the chemicals of concern (CoCs) include acidic gases, volatile organic compounds (VOCs), and sulfur-containing compounds; optionally the acidic gases are halogenated gases including HCl, HBr, and HF; optionally the VOCs are propylene, 1,3-butadiene, chloromethane, bromomethane, chloroethane, and vinyl chloride; optionally the sulfur-containing compounds are sulfur oxides (SOx); and/or
the oil phase comprises monomers of degraded raw materials including gasoline and diesel, optionally an amount of gasoline is about 63.68% and an amount of diesel is about 20.08%.

* * * * *